US010707987B2

(12) United States Patent
Xu et al.

(10) Patent No.: US 10,707,987 B2
(45) Date of Patent: Jul. 7, 2020

(54) CHANNEL STATE INFORMATION AND ADAPTIVE MODULATION AND CODING DESIGN FOR LONG-TERM EVOLUTION MACHINE TYPE COMMUNICATIONS

(71) Applicant: QUALCOMM Incorporated, San Diego, CA (US)

(72) Inventors: Hao Xu, San Diego, CA (US); Tingfang Ji, San Diego, CA (US); Peter Gaal, San Diego, CA (US); Wanshi Chen, San Diego, CA (US); Zhifei Fan, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 15/409,350

(22) Filed: Jan. 18, 2017

(65) Prior Publication Data
US 2017/0126356 A1 May 4, 2017

Related U.S. Application Data

(63) Continuation of application No. 14/133,062, filed on Dec. 18, 2013, now Pat. No. 9,590,878.
(Continued)

(51) Int. Cl.
H04W 76/06 (2009.01)
H04W 72/04 (2009.01)
(Continued)

(52) U.S. Cl.
CPC .......... *H04L 1/0009* (2013.01); *H04L 1/0025* (2013.01); *H04L 1/0026* (2013.01);
(Continued)

(58) Field of Classification Search
None
See application file for complete search history.

(56) References Cited

U.S. PATENT DOCUMENTS 8,310,981 B2 11/2012 Damnjanovic et al.
2009/0238121 A1 9/2009 Kotecha
(Continued)

FOREIGN PATENT DOCUMENTS

CN 1881842 A 12/2006
EP 2291023 A1 3/2011
(Continued)

OTHER PUBLICATIONS

International Search Report and Written Opinion—PCT/US2014/010552—ISA/EPO—dated Aug. 29, 2014.
(Continued)

*Primary Examiner* — Noel R Beharry
*Assistant Examiner* — Ruihua Zhang
(74) *Attorney, Agent, or Firm* — Arent Fox LLP

(57) ABSTRACT

A method, an apparatus, and a computer program product for wireless communication are provided. The apparatus may be a UE. The UE determines CSI. The UE determines whether to send the CSI based on at least one of a timer or a threshold. The UE sends the CSI upon determining to send the CSI. The UE may send the CSI in a MAC header upon determining to send the CSI. When the UE determines whether to send the CSI based on the threshold, the UE may determine whether to send the CSI based on a difference between the CSI and reference CSI. The UE may determine the reference CSI based on at least one of previously reported CSI, fixed CSI, or an MCS of a received data transmission from a base station. The UE may send CSI to the base station in an initial connection setup with the base station.

21 Claims, 18 Drawing Sheets

Related U.S. Application Data

(60) Provisional application No. 61/753,395, filed on Jan. 16, 2013.

(51) Int. Cl.
*H04L 1/00* (2006.01)
*H04L 12/26* (2006.01)
*H04W 24/08* (2009.01)
*H04W 76/30* (2018.01)

(52) U.S. Cl.
CPC ............ *H04L 1/0027* (2013.01); *H04L 43/06* (2013.01); *H04W 24/08* (2013.01); *H04W 72/0413* (2013.01); *H04W 76/30* (2018.02); *H04L 1/0032* (2013.01)

(56) References Cited

U.S. PATENT DOCUMENTS

| | | | | |
|---|---|---|---|---|
| 2009/0257408 A1* | 10/2009 | Zhang | .................... | H04L 1/1621 370/336 |
| 2009/0316815 A1 | 12/2009 | Glazko et al. | | |
| 2009/0323641 A1 | 12/2009 | Futagi et al. | | |
| 2010/0061438 A1 | 3/2010 | Tan et al. | | |
| 2011/0032895 A1* | 2/2011 | Englund | ............... | H04L 1/0026 370/329 |
| 2011/0200020 A1* | 8/2011 | Xu | ......................... | H04L 1/1657 370/336 |
| 2011/0249578 A1 | 10/2011 | Nayeb et al. | | |
| 2011/0250919 A1 | 10/2011 | Barbieri et al. | | |
| 2011/0310831 A1* | 12/2011 | Bhattad | ................ | H04B 7/0413 370/329 |
| 2012/0033624 A1 | 2/2012 | Luo et al. | | |
| 2012/0063343 A1 | 3/2012 | Yuda et al. | | |
| 2012/0176996 A1 | 7/2012 | Kim et al. | | |
| 2012/0201166 A1 | 8/2012 | Digirolamo et al. | | |
| 2012/0328034 A1 | 12/2012 | Nabar et al. | | |
| 2013/0021925 A1 | 1/2013 | Yin et al. | | |
| 2013/0114430 A1 | 5/2013 | Koivisto et al. | | |
| 2013/0176920 A1* | 7/2013 | Seo | ........................ | H04L 1/1861 370/280 |
| 2013/0182688 A1 | 7/2013 | Damnjanovic et al. | | |
| 2013/0250822 A1 | 9/2013 | Yang et al. | | |
| 2013/0258874 A1 | 10/2013 | Khoshnevis et al. | | |
| 2014/0198677 A1 | 7/2014 | Xu et al. | | |
| 2015/0305057 A1 | 10/2015 | Eriksson et al. | | |
| 2015/0351092 A1* | 12/2015 | Seo | ........................ | H04W 4/70 370/329 |

FOREIGN PATENT DOCUMENTS

| | | |
|---|---|---|
| JP | 2010507978 A | 3/2010 |
| WO | 2008053553 A1 | 5/2008 |
| WO | 2009096698 A2 | 8/2009 |
| WO | 2009116614 A1 | 9/2009 |
| WO | 2010131487 A1 | 11/2010 |
| WO | 2011130384 A1 | 10/2011 |
| WO | 2012074318 A2 | 6/2012 |
| WO | 2012127638 A1 | 9/2012 |

OTHER PUBLICATIONS

Partial International Search Report—PCT/US2014/010552—ISA/EPO—dated May 9, 2014.

* cited by examiner

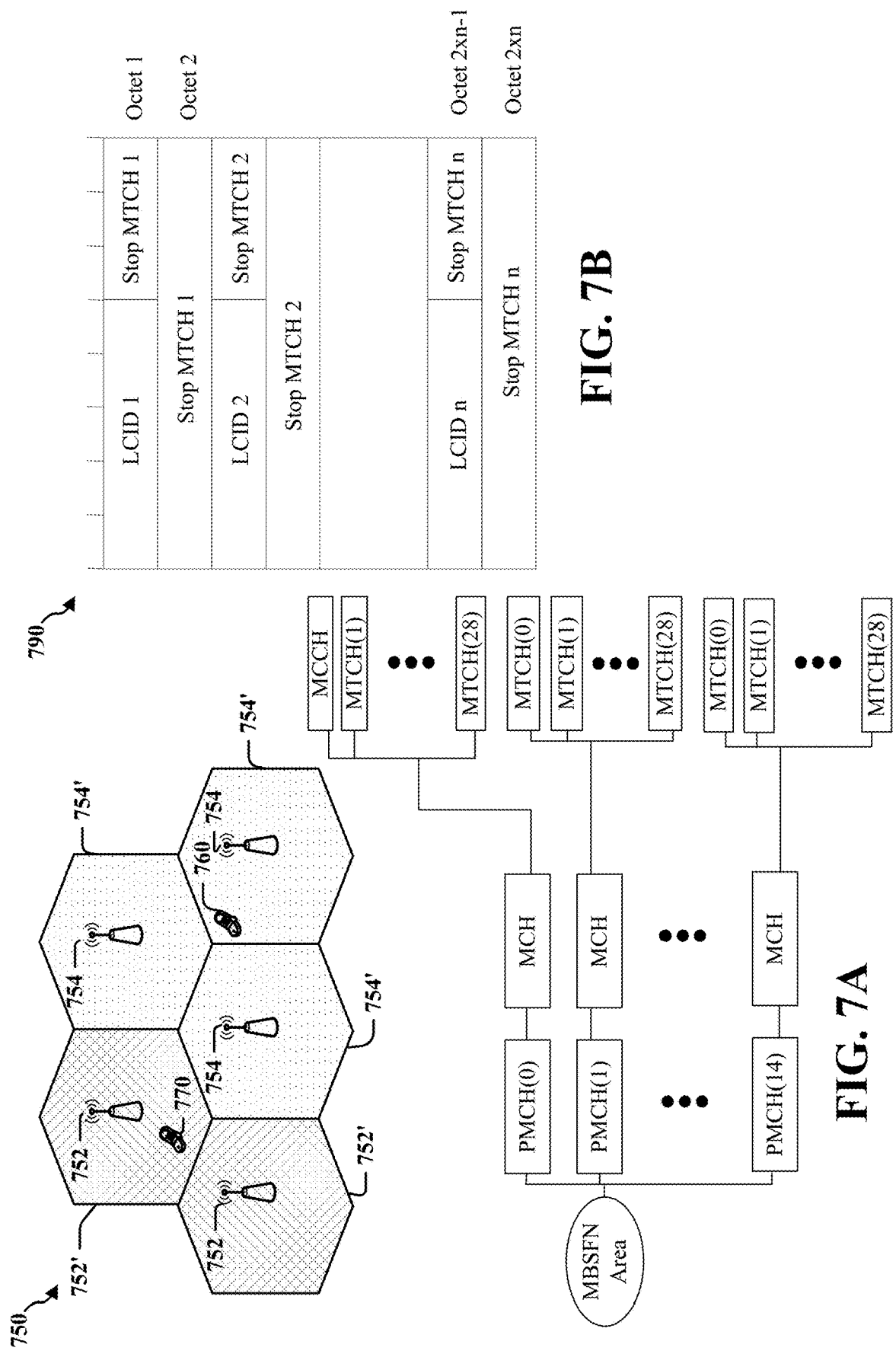

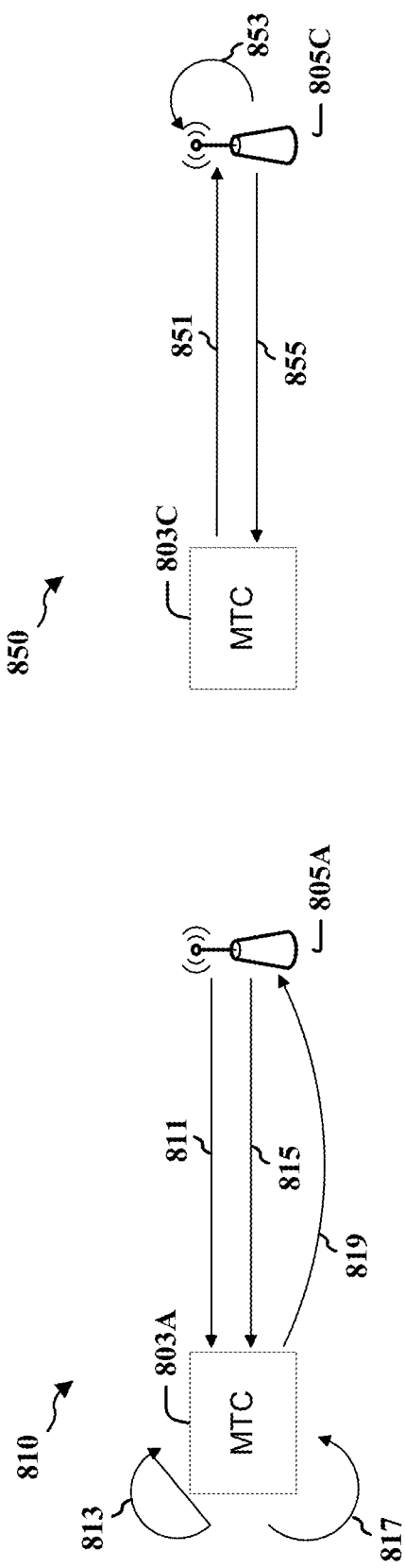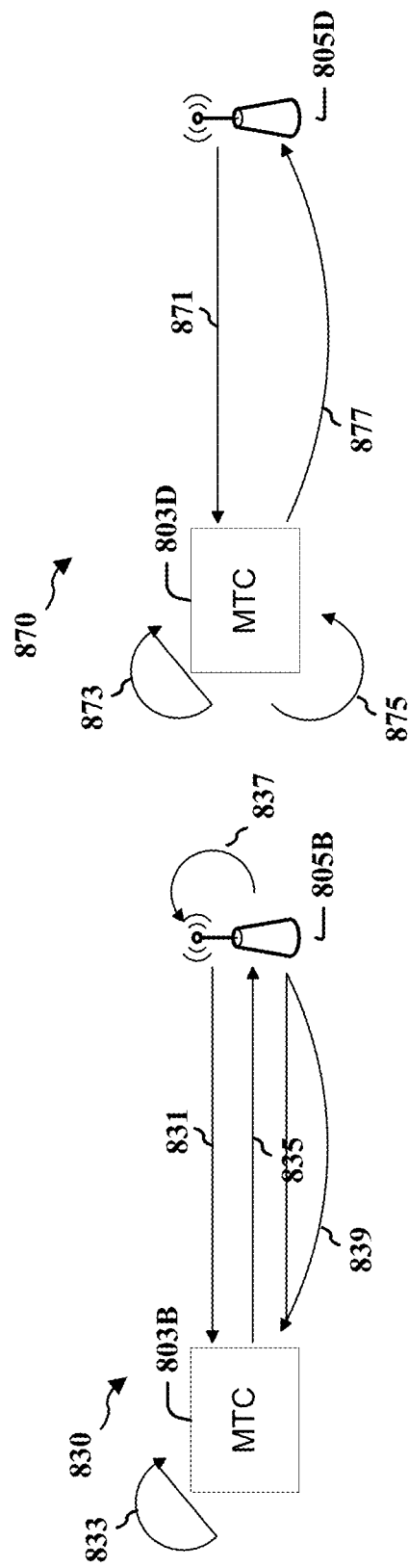

US 10,707,987 B2

CHANNEL STATE INFORMATION AND ADAPTIVE MODULATION AND CODING DESIGN FOR LONG-TERM EVOLUTION MACHINE TYPE COMMUNICATIONS

CROSS-REFERENCE TO RELATED APPLICATION(S)

This application is a continuation of U.S. application Ser. No. 14/133,062, entitled "CHANNEL STATE INFORMATION AND ADAPTIVE MODULATION AND CODING DESIGN FOR LONG-TERM EVOLUTION MACHINE TYPE COMMUNICATIONS" and filed on Dec. 18, 2013, which claims the benefit of U.S. Provisional Application Ser. No. 61/753,395, entitled "CHANNEL STATE INFORMATION AND ADAPTIVE MODULATION AND CODING DESIGN FOR LONG-TERM EVOLUTION MACHINE TYPE COMMUNICATIONS" and filed on Jan. 16, 2013, which are expressly incorporated by reference herein in their entirety.

BACKGROUND

Field

The present disclosure relates generally to communication systems, and more particularly, to channel state information (CSI) and adaptive modulation and coding (AMC) design for long-term evolution (LTE) machine type communications (MTC).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long LTE. LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus is an MTC UE. The UE determines a first modulation and coding scheme (MCS) that corresponds to an estimated channel between a base station and the UE. The UE receives data modulated and coded with a second MCS from the base station. The UE determines whether the second MCS differs from the first MCS by more than a threshold. The UE sends CSI after determining that the second MCS differs from the first MCS by more than the threshold.

In another aspect of the disclosure, a method, a computer program product, and an apparatus are provided. The apparatus is an MTC UE. The UE receives a transmission time interval (TTI) bundling transmission from a base station. The UE decodes a subset of the TTI bundling transmission. The UE sends an acknowledgment to the base station to terminate the TTI bundling transmission early upon decoding the subset of the TTI bundling transmission. CSI is indicated to the base station through a percentage of the TTI bundling transmission received by the UE.

In another aspect of the disclosure, a method, a computer program product, and an apparatus are provided. The apparatus sends an uplink transmission to a base station. The apparatus receives a data transmission from the base station, the data transmission having at least one of a MCS determined based on the uplink transmission or a TTI bundling size determined based on the uplink transmission.

In another aspect of the disclosure, a method, a computer program product, and an apparatus are provided. The apparatus is an MTC UE. The UE determines CSI. The UE determines whether to send the CSI based on at least one of a timer or a threshold. The UE sends the CSI upon determining to send the CSI.

BRIEF DESCRIPTION OF THE DRAWINGS

FIG. 7A is a diagram illustrating an example of an evolved Multimedia Broadcast Multicast Service channel configuration in a Multicast Broadcast Single Frequency Network.

FIG. 7B is a diagram illustrating a format of a Multicast Channel Scheduling Information Media Access Control control element.

FIG. 8A is a diagram for illustrating a first exemplary method.

FIG. 8B is a diagram for illustrating a second exemplary method.

FIG. 8C is a diagram for illustrating a third exemplary method.

FIG. 8D is a diagram for illustrating a fourth exemplary method.

DETAILED DESCRIPTION

Figure 1:
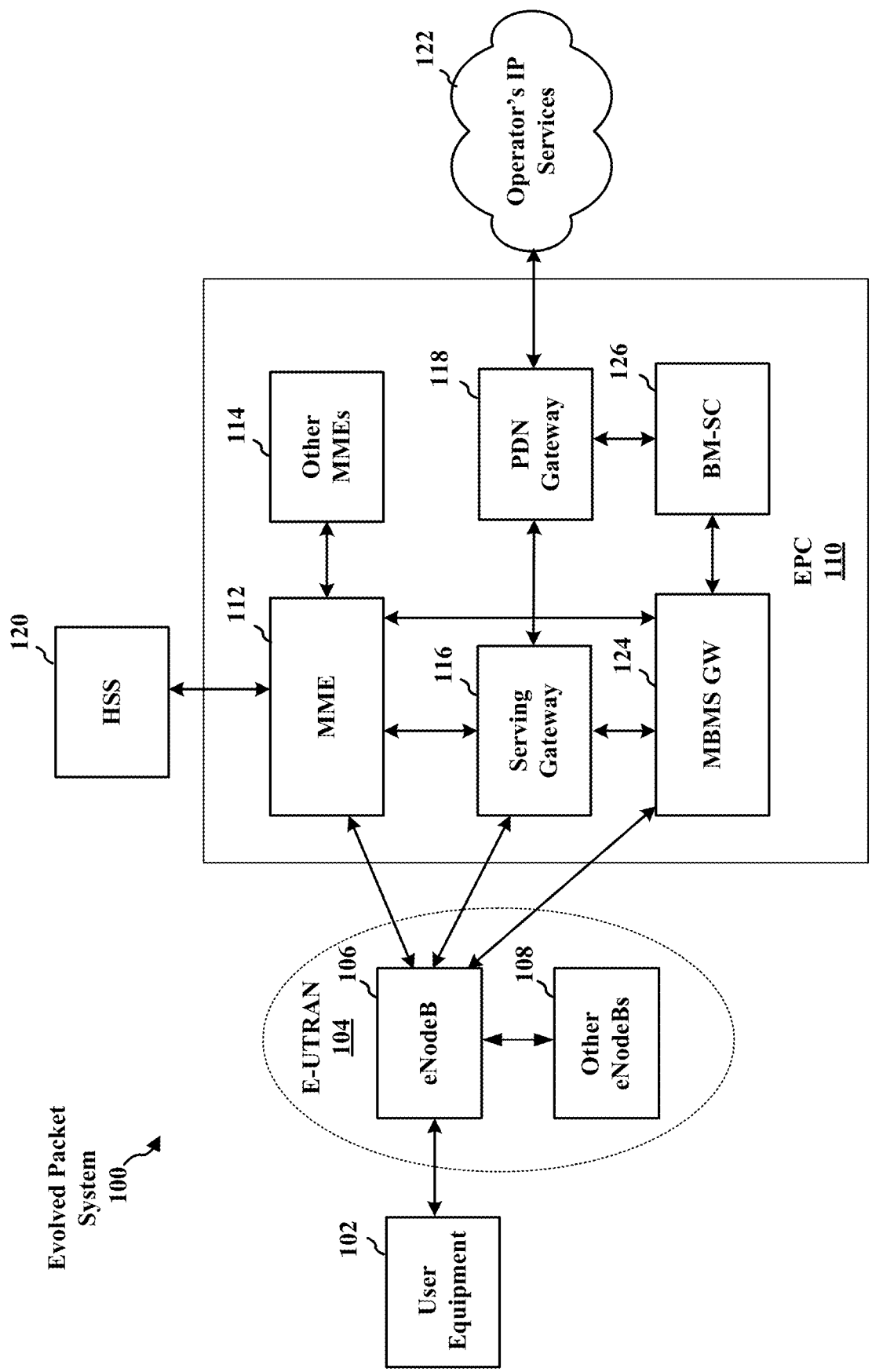
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture. The LTE network architecture may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 includes a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS). The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
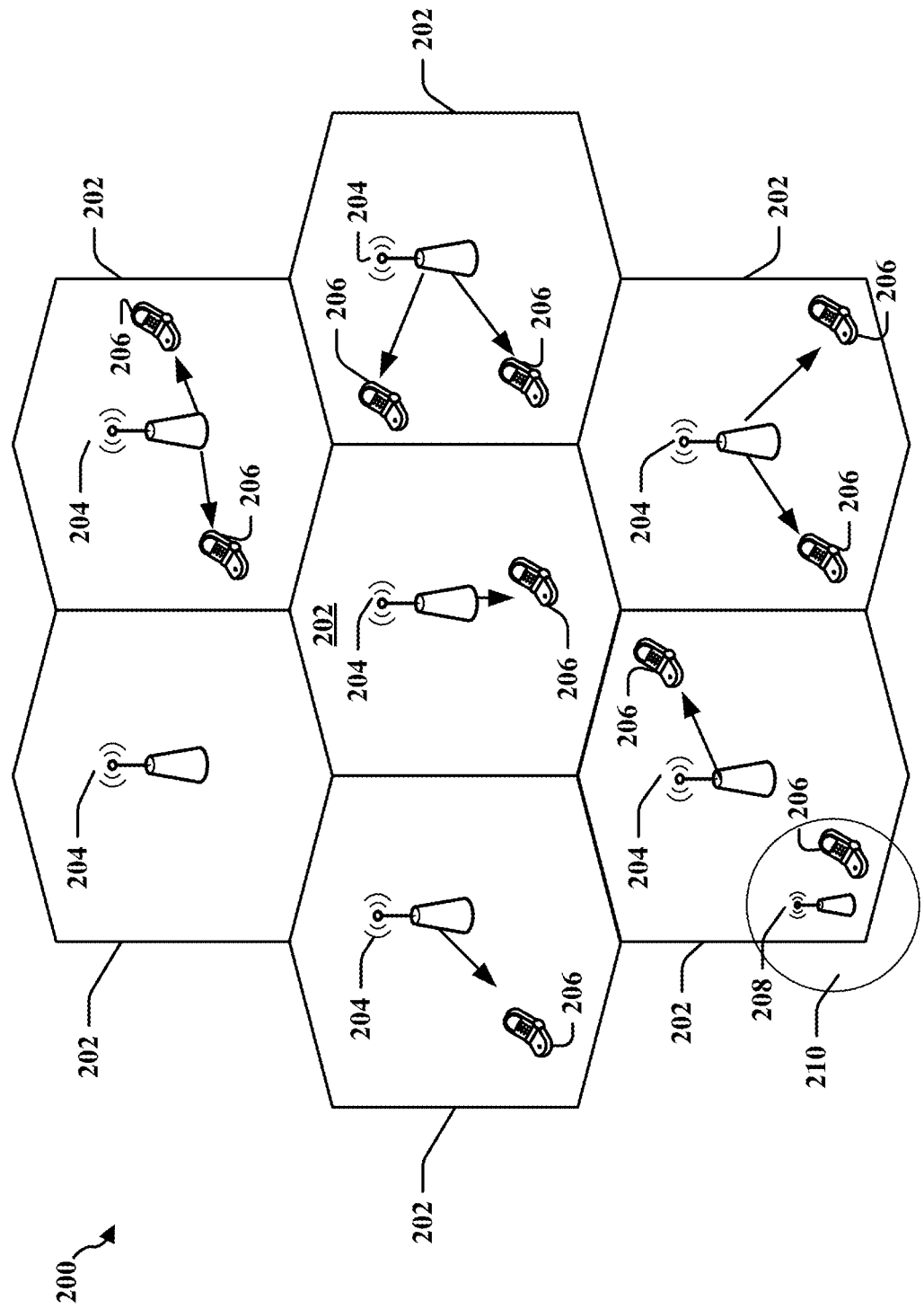
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
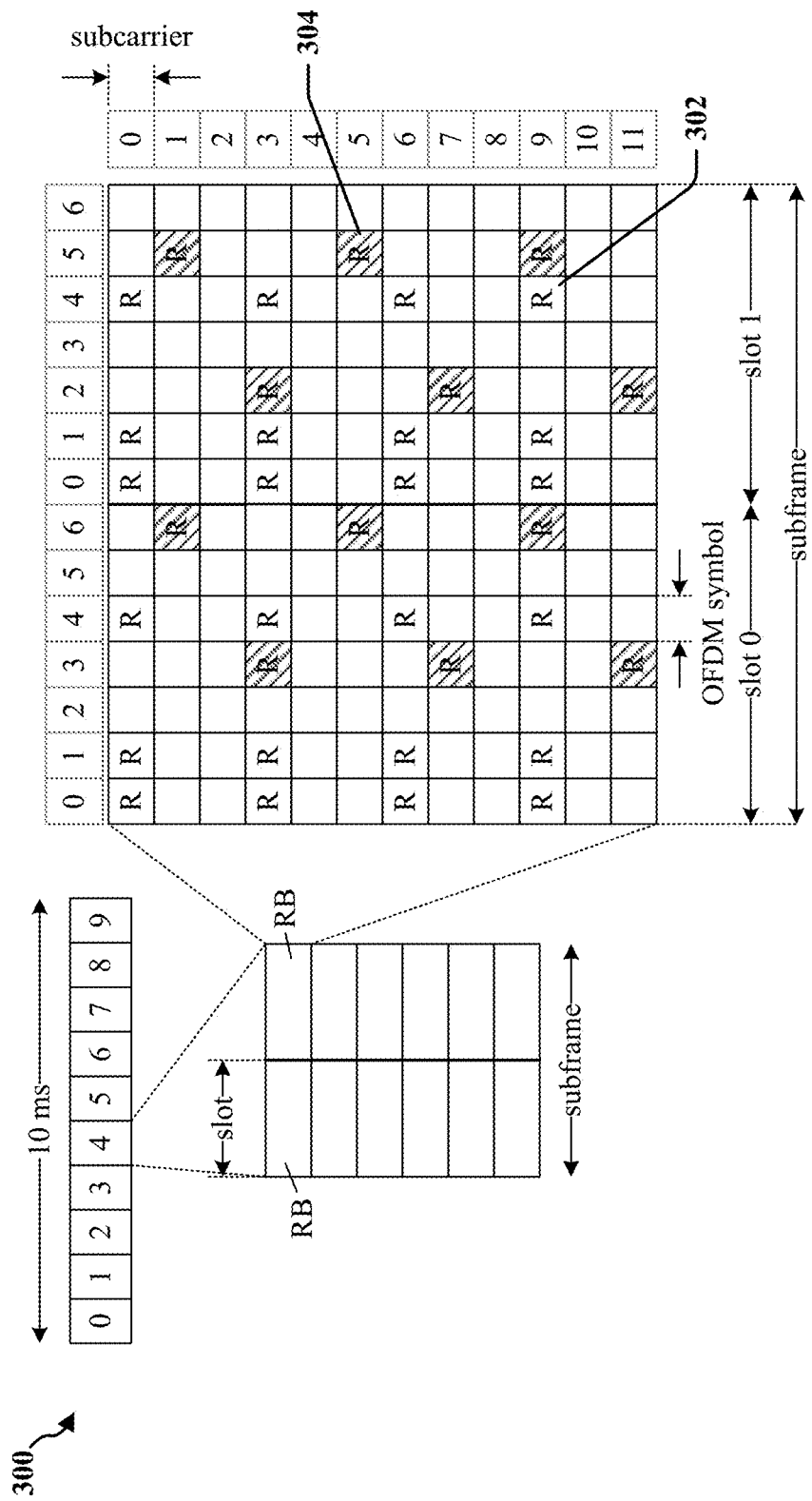
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
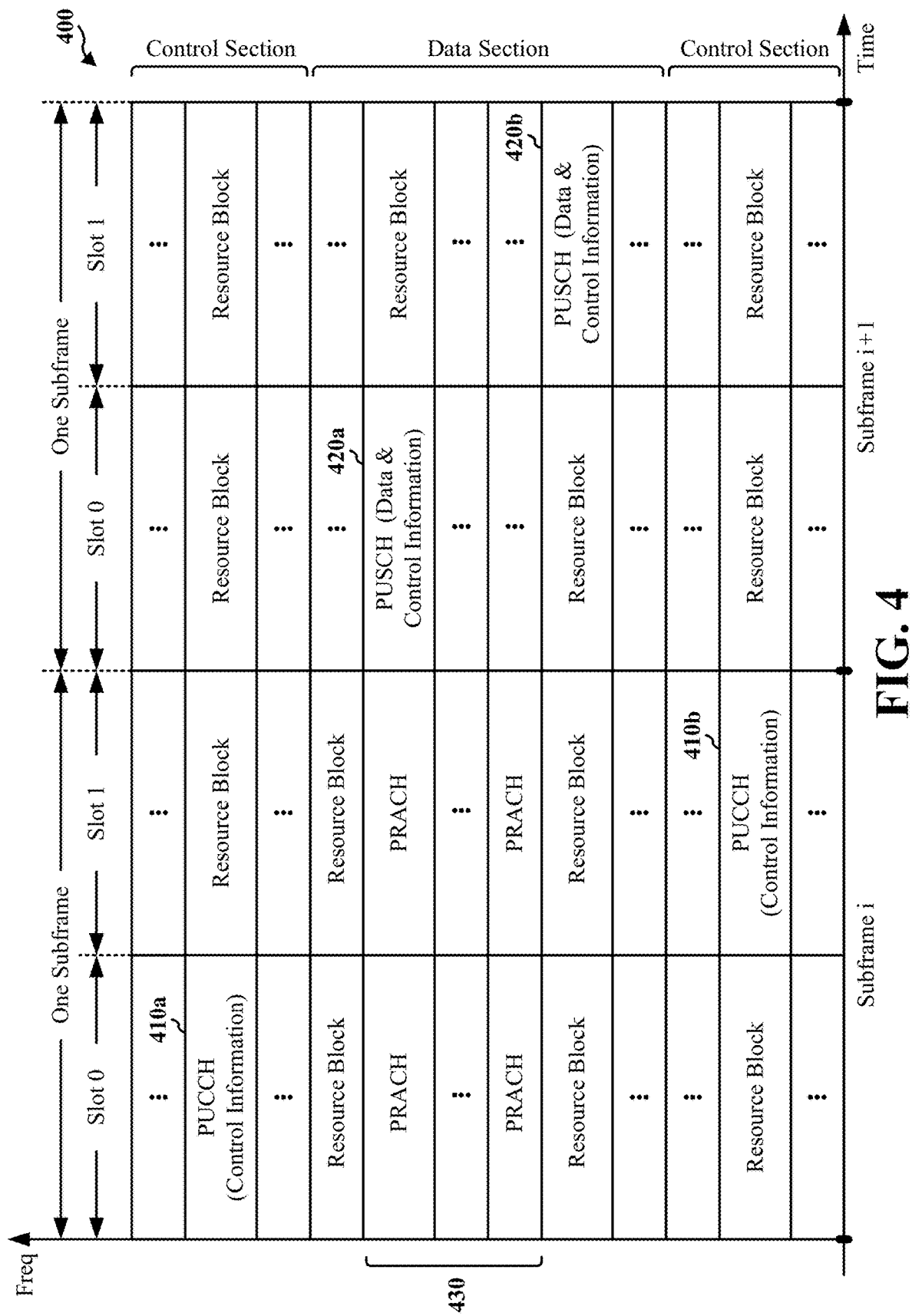
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (RACH) (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
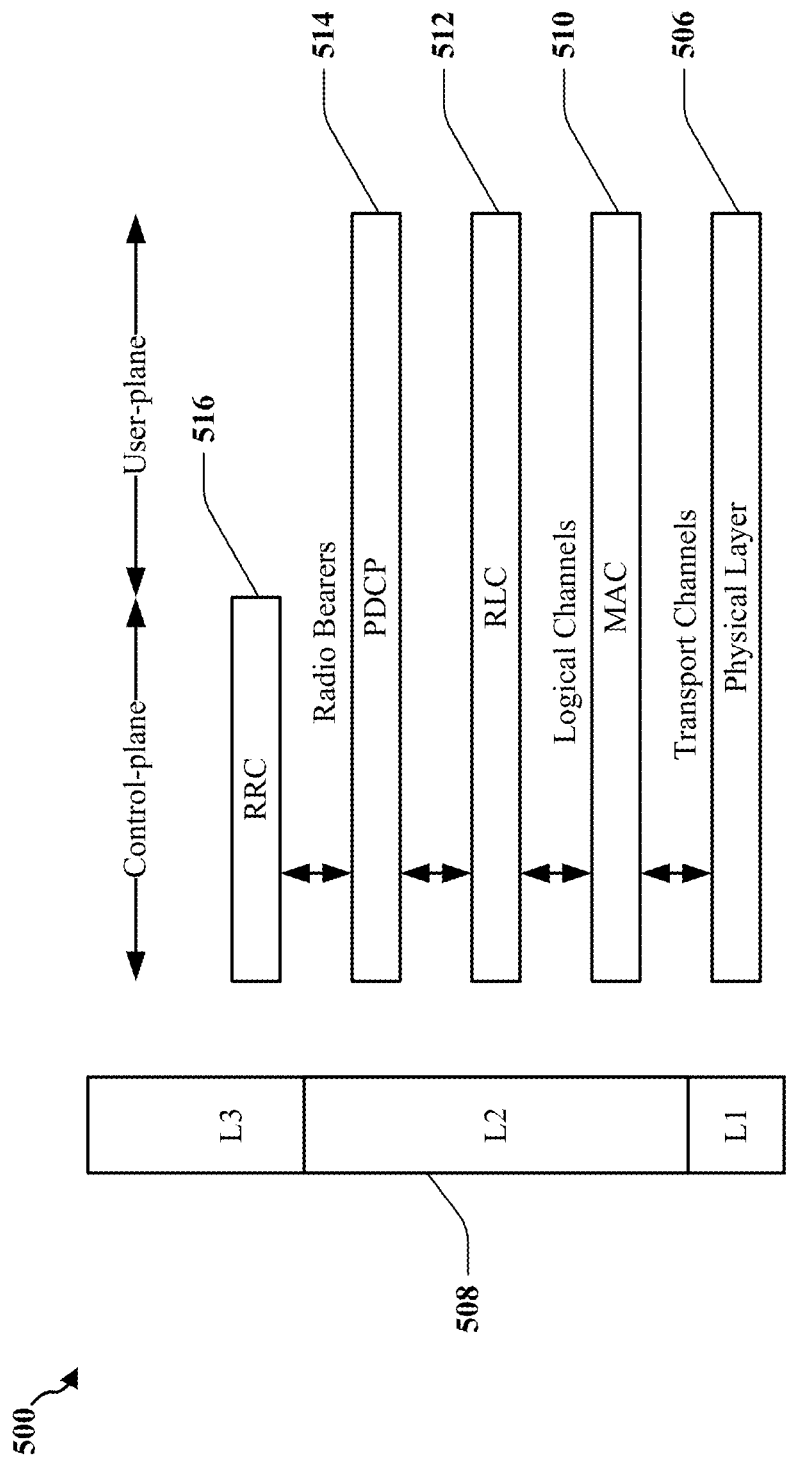
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a MAC sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
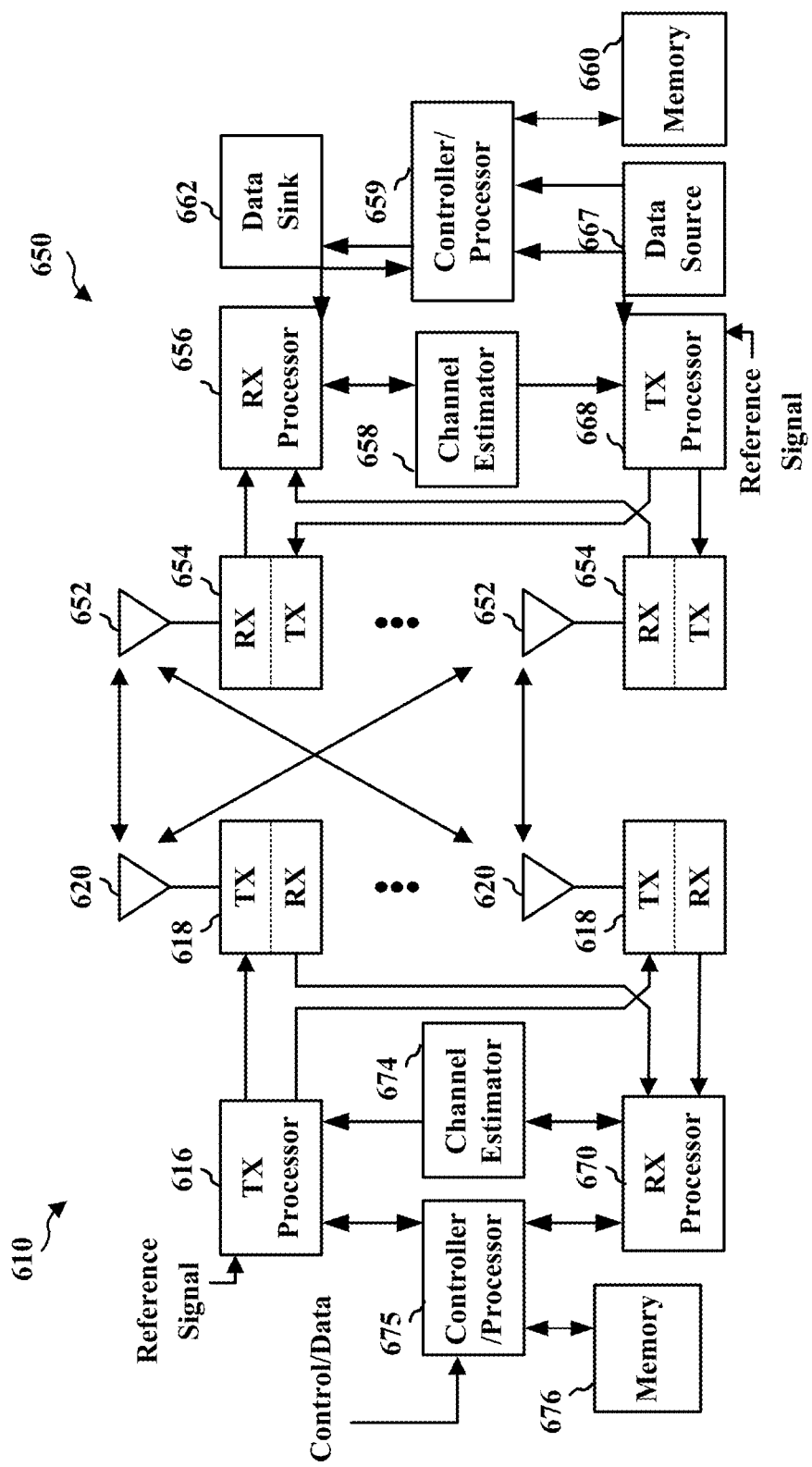
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

FIG. 7A is a diagram 750 illustrating an example of an evolved MBMS (eMBMS) channel configuration in an MBSFN. The eNBs 752 in cells 752' may form a first MBSFN area and the eNBs 754 in cells 754' may form a second MBSFN area. The eNBs 752, 754 may each be associated with other MBSFN areas, for example, up to a total of eight MBSFN areas. A cell within an MBSFN area may be designated a reserved cell. Reserved cells do not provide multicast/broadcast content, but are time-synchronized to the cells 752', 754' and have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 7A, the first MBSFN area may support a first eMBMS broadcast service, such as by providing a particular news broadcast to UE 770. The second MBSFN area may support a second eMBMS broadcast service, such as by providing a different news broadcast to UE 760. Each MBSFN area supports a plurality of physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

A UE can camp on an LTE cell to discover the availability of eMBMS service access and a corresponding access stratum configuration. In a first step, the UE acquires a system information block (SIB) 13 (SIB13). In a second step, based on the SIB13, the UE acquires an MBSFN Area Configuration message on an MCCH. In a third step, based on the MBSFN Area Configuration message, the UE acquires an MCH scheduling information (MSI) MAC control element. The SIB13 indicates (1) an MBSFN area identifier of each MBSFN area supported by the cell; (2) information for acquiring the MCCH such as an MCCH repetition period (e.g., 32, 64, . . . , 256 frames), an MCCH offset (e.g., 0, 1, . . . , 10 frames), an MCCH modification period (e.g., 512, 1024 frames), a signaling modulation and coding scheme (MCS), subframe allocation information indicating which subframes of the radio frame as indicated by repetition period and offset can transmit MCCH; and (3) an MCCH change notification configuration. There is one MBSFN Area Configuration message for each MBSFN area. The MBSFN Area Configuration message indicates (1) a temporary mobile group identity (TMGI) and an optional session identifier of each MTCH identified by a logical channel identifier within the PMCH, (2) allocated resources (i.e., radio frames and subframes) for transmitting each PMCH of the MBSFN area and the allocation period (e.g., 4, 8, . . . , 256 frames) of the allocated resources for all the PMCHs in the area, and (3) an MCH scheduling period (MSP) (e.g., 8, 16, 32, . . . , or 1024 radio frames) over which the MSI MAC control element is transmitted.

FIG. 7B is a diagram 790 illustrating the format of an MSI MAC control element. The MSI MAC control element may be sent once each MSP. The MSI MAC control element may be sent in the first subframe of each scheduling period of the PMCH. The MSI MAC control element can indicate the stop frame and subframe of each MTCH within the PMCH. There is one MSI per PMCH per MBSFN area.

In LTE, there has been interest in improvement of spectral efficiency, ubiquitous coverage, enhanced quality of service (QoS) support, etc., especially in high end devices such as smart phones, tablets, etc. There also has been interest in low-cost MTC UEs based on LTE, while considering factors such as reduction of maximum bandwidth, a single receive RF chain, reduction of peak rate, reduction of transmit power, and a half duplex operation. In LTE, an eNB performs AMC based on received CSI feedback. CSI feedback includes a channel quality indication (CQI), a rank indication (RI), and/or a precoding matrix index (PMI). The CSI feedback provides accurate information for a scheduler of the eNB for the purpose of the AMC. Having the CSI feedback is desirable because inefficiency in throughput and power consumption may result if there is no CSI feedback. For example, without the CSI feedback at a low SNR, using a high MCS will result in a high residual block error rate (BLER) even after a long TTI bundling. The high residual BLER can trigger higher layer retransmission. On the other hand, without the CSI feedback at a high SNR, using a low MCS will result in a much longer transmission. However, the conventional CSI feedback feature usually involves frequent CSI feedback, which can consume a large amount of power and UL resources. Moreover, the CSI feedback calculation involves extensive computation, which may increase a computational cost of MTC UEs. Therefore, there is a need for an efficient approach for providing CSI feedback. Methods for efficiently providing CSI feedback are provided infra with respect to FIGS. 8A, 8B, 8C, and 8D. Each of the methods provided with respect to FIGS. 8A, 8B, 8C, and 8D may be performed individually or together with one or more of the other methods.

FIG. 8A is a diagram 810 for illustrating a first exemplary method. During an initial connection set up (e.g., in a RACH procedure), an MTC UE 803A may convey CSI to the eNB 805A. The MTC UE 803A receives reference (pilot) signals 811 from an eNB 805A. Based on the reference signals, the MTC UE 803A estimates a channel between the eNB 805A and the MTC UE 803A. The MTC UE 803A then determines 813 a first (expected) MCS that corresponds to the estimated channel between the eNB 805A and the MTC UE 803A. The MTC UE 803A may estimate the channel in each of multiple subframes. The MTC UE 803A may average the channel estimate over the multiple subframes. After determining the first MCS, the MTC UE 803A receives data 815 modulated and coded with a second (current) MCS from the eNB 805A, and determines 817 whether the second MCS differs from the first MCS by more than a threshold. If the second (current) MCS differs from the first (expected) MCS by more than a threshold T, then the second MCS significantly deviates from the true channel statistics. If the MTC UE 803A determines that the second MCS significantly deviates from the true channel statistics, the MTC UE 803A sends CSI 819 to the eNB 805A. According to the first exemplary method, the MTC UE 803A provides CSI feedback only when the CSI feedback is needed (e.g., after the second MCS differs from the first MCS by more than the threshold). Providing CSI feedback only when needed saves power and UL resources.

The threshold T may be an integer greater than or equal to zero that corresponds to a number of bits per symbol that the MCS provides. For example, assume the current MCS is 16-QAM and the expected MCS is QPSK. 16-QAM provides 4 bits/symbol, whereas QPSK provides 2 bits/symbol. The difference between 16-QAM and QPSK may be equal to 2. If the threshold T is set to 0 or 1, then the MTC UE 803A will determine that the current MCS significantly deviates from the expected MCS. However, if the threshold T is set to 2, then because the difference between 16-QAM and QPSK is not greater than T, the MTC UE 803A will determine that the current MCS does not significantly deviate from the expected MCS. If the threshold T is set to 2 and the expected MCS is QPSK, the MTC UE 803A will only determine that the current MCS significantly deviates from the true channel statistics when the current MCS is 64-QAM or higher, corresponding to 5 or more bits/symbol. The threshold T may be determined in other ways, such as for example, corresponding to an MCS index. For example, assume the current MCS is MCS 4 (the MCS index is 4) and the expected MCS is MCS 2 (the MCS index is 2). The difference between MCS 2 and MCS 4 may be equal to 2. If the threshold T is set to 0 or 1, then the MTC UE 803A will determine that the current MCS significantly deviates from the expected MCS. However, if the threshold T is set to 2, then because the difference between MCS 2 and MCS 4 is not greater than T, the MTC UE 803A will determine that the current MCS does not significantly deviate from the expected MCS. If the threshold T is set to 2 and the expected MCS is MCS 2, the MTC UE 803A will only determine that the current MCS significantly deviates from the true channel statistics when the current MCS is MCS 5 or higher.

The eNB 805A may determine an initial AMC based on a lowest MCS (e.g., BPSK) or based on CSI feedback from the MTC UE 803A (e.g., CSI feedback provided during an initial connection setup, such as during a RACH procedure). The eNB 805A may continue to use the same MCS for DL transmissions unless the MTC UE 803A provides updated CSI feedback. If the MTC UE 803A provides updated CSI feedback, the eNB 805A may determine the AMC based on the received CSI feedback and continue to use the determined AMC until additional CSI feedback is received.

As discussed supra, the MTC UE 803A may perform long-term averaging of the channel, but send the CSI to the eNB 805A only if the current MCS significantly deviates (better or worse) from its true channel statistics. Accordingly, the MTC UE 803A may average the channel between the eNB 805A and the MTC UE 803A over multiple subframes, and send CSI feedback only if the expected MCS corresponding to the estimated channel and the current MCS differ by a threshold. Thus, the CSI feedback is event driven. For example, if the MTC UE 803A determines an expected MCS of QPSK, but receives a data transmission with 64-QAM (which is significantly better than QPSK), the MTC UE 803A may determine to send updated CSI feedback to the eNB 805A. For another example, if the MTC UE 803A determines that an expected MCS is 64-QAM, but receives a data transmission with QPSK (which is significantly worse than 64-QAM), the MTC UE 803A may determine to send updated CSI feedback to the eNB 805A.

Once the MTC UE 803A determines to send CSI feedback to the eNB 805A, the

MTC UE 803A may store the CSI feedback until the next UL transmission. In a first configuration, the MTC UE 803A may include the CSI in a MAC header within a scheduled UL data (PUSCH) transmission sent to the eNB 805A. In a second configuration, if there is no scheduled PUSCH transmission, but the MTC UE 803A has a buffer status report (BSR) to transmit to the eNB 805A (i.e., the MTC UE 803A has data to transmit), the MTC UE 803A may send the CSI in a MAC header with an UL PUSCH transmission including the BSR. The BSR indicates to the eNB 805A an amount of data in the buffer of the MTC UE 803A. If the MTCH UE 803A has a BSR to send to the eNB 805A, the MTC UE 803A will send a scheduling request (SR) to the eNB 805A requesting UL resources for sending the BSR. In the second configuration, the MTC UE 803A sends the CSI and BSR in the resources allocated for the BSR.

In a third configuration, if the MTC UE 803A has no scheduled UL transmission (e.g., PUSCH transmission) and has no BSR to transmit to the eNB 805A, the MTC UE 803A may send an SR or perform a random access channel (RACH) procedure in order to send updated CSI to the eNB 805A. In the third configuration, the MTC UE 803A may send a request to the eNB 805A for sending the CSI upon determining that the second MCS differs from the first MCS by more than the threshold. The MTC UE 803A may receive a response from the eNB 805A based on the request and send the CSI based on the received response. In one configuration, the request may be an SR and the received response may be an UL grant. Thus, for example, when the current MCS differs from the expected MCS by more than the threshold, the MTC UE 803A has no scheduled PUSCH transmission, and the MTC UE 803A has no BSR to transmit to the eNB 805A, an SR may be triggered to request the eNB 805A to provide UL resources for sending the CSI. In another configuration, the request and response may be associated with a RACH procedure. Accordingly, the request may be a random access preamble and the response may be a random access response. Thus, for example, when the current MCS differs from the expected MCS by more than the threshold, the MTC UE 803A has no scheduled PUSCH transmission, and the MTC UE 803A has no BSR to transmit to the eNB 805A, the MTC UE 803A may perform a RACH procedure and send a random access preamble to the eNB 805A. The MTC UE 803A may then receive a random access response from the eNB 805A. Based on the received random access response, the MTC UE 803A may send the CSI to the eNB 805A. In yet another configuration, the MTC UE 803A may select a RACH format for a RACH procedure based on the CSI and indicate the CSI to the eNB 805A through the selected RACH format in a RACH procedure. The MTC UE 803A may indicate the CSI through a selected RACH format in the random access preamble and/or through a selected RACH format in the response to the random access response.

In a fourth configuration, the MTC UE 803A may send the CSI to the eNB 805A through an aperiodic CQI transmission. In the fourth configuration, the MTC UE 803A receives an UL grant from the eNB 805A, and the UL grant specifically indicates that CSI is to be sent in the allocated UL resources. The MTC UE 803A transmits the CSI feedback in the allocated UL resources.

In a fifth configuration, if there is no UL transmission, the eNB 805A may occasionally send an UL grant to the MTC UE 803A for sending CSI feedback. Thus, when the MTC UE 803A has not sent CSI for a time period greater than a threshold time period, the eNB 805A may send an UL grant. The MTC UE 803A may receive the UL grant from the eNB 805A and send CSI to the eNB 805A based on the received UL grant from the eNB 805A. This procedure may be tied to a supervision procedure.

As discussed supra, the CSI reporting may be based on the MCS difference larger than a threshold. In addition, an alternative approach may be implemented to compare a currently measured path loss to a last reported path loss. If a difference between the currently measured path loss and the last reported path loss is significantly large (e.g., larger than a certain threshold), then the UE may send the CSI.

There are several approaches for reporting CSI feedback. In a first approach, the MTC UE 803A may determine the CSI based on a lowest quality channel estimate over multiple subframes and report the CSI corresponding to the worst MCS (for power optimization). In a second approach, the MTC UE 803A may determine the CSI based on an average of the estimated channels over multiple frames and report the average CSI (for spectral efficiency optimization). In a third approach, the MTC UE 803A may determine both worst case and average CSI and report both the worse case and average CSI (for eNB scheduling flexibility). In a fourth approach, the MTC UE 803A may determine the CSI based on one estimate of the channel among the estimated channels of the multiple subframes. In a fifth approach, the MTC UE 803A may receive a configuration indicating how to determine the CSI, and then determine the CSI based on the received configuration. The configuration may indicate to the MTC UE 803A to use one of the first through fourth approaches, or may indicate to the MTC UE 803A to use a different approach for reporting CSI feedback.

If an MBSFN broadcast is used for data transmission, the MTC UE 803A may receive information indicating MBSFN subframes, and determine the CSI based on the received information. Thus, the MTC UE 803A may be notified of subframes that are transmitted using multicast/broadcast, and the MTC UE 803A may treat the CSI feedback differently for those subframes. For example, if the MTC UE 803A receives multicast/broadcast data, CSI feedback determined based on the received multicast/broadcast data may better than CSI feedback determined based on a received unicast data. Accordingly, the MTC UE 803A may adjust or ignore channel estimates based on multicast/broadcast data.

If a decoupled DL and UL operation is used for the MTC UE 803A, one cell in the eNB 805A may be dedicated for DL while another cell in eNB 805A may be dedicated for UL. In this case, the MTC UE 803A may receive the data from a first cell of the eNB 805A and send CSI to a second cell of the eNB 805A, where the second cell is different from the first cell. The first cell of the eNB 805A may be a DL serving cell, and the second cell of the eNB 805A may be an UL serving cell.

As discussed supra, the MTC UE 803A may select a RACH format for a RACH procedure based on the CSI. The MTC UE 803A sends the CSI through the RACH procedure and indicates the CSI through the selected RACH format. In other words, the MTC UE 803A may choose a RACH format (e.g., a different length of a RACH bundle) to indicate to the eNB 805A its radio condition, such that the format of RACH indicates the CSI to the eNB 805A. For example, if the channel is in a poor condition, the MTC UE 803A may select a RACH with a longer transmission time. This RACH format of the longer transmission time indicates to the eNB 805A that the channel is in a poor condition. On the other hand, for example, if the channel is in a good condition, the MTC UE 803A may select a compact RACH channel, and this RACH format indicates to the eNB 805A that the channel is in a good condition. Depending on the RACH format, the eNB 805A may select an appropriate MCS and a bundling size for a subsequent DL transmission (e.g., msg2 with bundling). Similarly, the CSI information can be also sent in msg3 or msg5 during the RACH and RRC connection setup procedure.

For an initial RACH procedure, the MTC UE 803A measures the DL path loss, and depending on the path loss, selects one of multiple RACH sequences/signatures (also referred to as format). If the MTC UE 803A selects a normal RACH transmission, then subsequent transmissions by the MTC UE 803A (msg3 and msg5) and the eNB 805A (msg2 and msg4) do not use TTI bundling. If the MTC UE 803A selects a bundled RACH transmission with long TTI, then subsequent transmissions by the MTC UE 803A (msg3 and msg5) and the eNB 805A (msg2 and msg4) use the lowest MCS (e.g., BPSK) with TTI bundling.

The CSI feedback may be combined with other reports. In one approach, the MTC UE 803A may receive a periodic supervision message from the eNB 805A, and send a response to the eNB 805A based on the received periodic supervision message, where the CSI is sent with the response. A periodic supervision may be needed to determine whether the MTC UE 803A is accessible or whether the MTC UE 803A is out of coverage or out of service (e.g., due to a bad battery). Thus, by sending a periodic supervision message to the MTC UE 803A and receiving a response from the MTC UE 803A, the eNB 805A can determine whether the MTC UE 803A is alive. For example, eNB 805A may send a periodic supervision message, and if the MTC UE 803A sends back an acknowledgement in response to the request, the eNB 805A may determine that the MTC UE 803A is accessible. MTC UE 803A may also send CSI feedback with the acknowledgement to the supervision request.

In another approach for combining the CSI with other reports, the MTC UE 803A may determine a reference signal received quality (RSRQ) and/or a reference signal received power (RSRP), and send the RSRP and/or the RSRQ to the eNB 805A, where the CSI is sent with the at least one of the RSRP or the RSRQ. Thus, according to this approach, the MTC UE 803A may measure the RSRP and/or the RSRQ and then when the MTC UE 803A reports the measured RSRP/RSRQ to the eNB 805A, the MTC UE 803A may combine the CSI report with RSRP/RSRQ reporting and send the combined report to the eNB 805A. The RSRP/RSRQ reporting may be event-driven. Further, the long term CSI reporting may be combined with the RSRP/RSRQ reporting.

In one configuration, the MTC UE 803A determines a first bundling size that corresponds to an estimated channel between the eNB 805A and the MTC UE 803A, receives data with a second bundling size from the eNB 805A, and determines whether the second bundling size differs from the first bundling size by more than a threshold. The MTC UE 803A then sends CSI after determining that the second bundling size differs from the first bundling size by more than the threshold. The threshold T may correspond to a bundling size difference. Accordingly, when a difference between the first bundling size and the second bundling size is greater than the threshold T, the MTC UE 803A may determine to send the CSI to the eNB 805A.

In one configuration, the eNB 805A schedules the MTC UE 803A for an uplink transmission with a particular MCS. The eNB 805A determines the UL channel between the MTC UE 803A and the eNB 805A. The UL channel may be based on reference signals received from the MTC UE 803A and/or whether the eNB can decode a bundled TTI transmission early. The eNB 805A may determine an expected MCS and/or TTI bundling size based on the determined uplink channel. If the current MCS and/or TTI bundling size being received from the MTC UE 803A is significantly different from the expected values (e.g., based on a threshold T, which may be a function of at least one of a modulation order (e.g., QPSK), an MCS, or a TTI bundling size), the eNB 805A may send to the MTC UE 803A information in the MAC header of a DL transmission packet requesting the MTC UE 803A to adjust the UL transmission MCS and/or TTI bundling size for subsequent transmissions.

FIG. 8B is a diagram 830 for illustrating a second exemplary method. In the second exemplary method, an eNB 805B transmits a long TTI bundle and an MTC UE 803B sends an acknowledgement to early terminate when the MTC UE 804 can decode a subset of the TTI bundle. The eNB 805B adapts to the channel condition based on the early termination statistics (e.g., the percentage of the TTI bundling transmission received by the MTC UE 803B). Accordingly, in the second exemplary method, the MTC UE 803B need not determine or send CSI. As shown in FIG. 8B, the MTC UE 803B receives a TTI bundling transmission 831 from the eNB 805B, and decodes 833 a subset of the TTI bundling transmission. When the MTC UE 803B decodes the subset of the TTI bundling transmission, the MTC UE 803B sends an acknowledgement 835 to the eNB 805B to terminate the TTI bundling transmission early. The CSI is indicated to the eNB 805B though a percentage of the TTI bundling transmission received by the MTC UE 803B. Thus, the eNB 805B can determine the CSI based on the percentage of the TTI bundling transmission received by the UE, and adapt 837 to the channel condition of this CSI by selecting an MCS appropriate for determined CSI. For example, if the percentage of the TTI bundling transmission received by the MTC UE 803B is low, this indicates to the eNB 805B that the MTC UE 803B was able to decode the subset of the TTI bundling transmission early, and thus the channel is good. The eNB 805B may also transmit data 839 modulated and coded with an MCS to the MTC UE 803B, where the MCS is based on the percentage of the TTI bundling transmission received by the MTC UE 803B. A TTI bundling size of the data 839 may also be based on the percentage of the TTI bundling transmission received by the MTC UE 803B.

In a default behavior, the eNB 805B may use a default bundling size and an MCS for DL transmissions and monitor acknowledgements from the MTC UE 803B for possible early termination. For example, the eNB 805B may initially use a default bundling size of 100 subframes (100 TTIs). If the MTC UE 803B early terminates after 10 subframes and informs the eNB 805B of the early termination, the eNB 805B may determine that the MTC UE 803B decoded the transmission after receiving just 10% of the transmission. The eNB 805B may then increase the MCS for a subsequent TTI bundled data transmission, and send the TTI bundled data transmission over 10 TTIs.

In addition, for half duplex operations or TDD, the bundling operation can overwrite the DL and UL direction change. For example, if there is a DL of 10 milliseconds of the TTI bundle, then all 10 milliseconds of DL transmission may be completed without changing a direction to UL.

In one configuration, the eNB 805B sends a first TTI bundling transmission to the MTC UE 803B. The eNB 805B receives an acknowledgment from the UE that the TTI bundling transmission was terminated early, and determines an MCS based on a percentage of the first TTI bundling transmission received by the MTC UE 803B. The eNB 805B sends a second TTI bundling transmission to the MTC UE 803B modulated and coded with the MCS determined based on the percentage of the first TTI bundling transmission FIG. 8C is a diagram 850 for illustrating a third exemplary method. In the third exemplary method, an MTC UE 803C transmits a one-shot signal (e.g., a one-shot sounding reference signal (SRS)) to an eNB 805C via an UL channel, and the eNB 805C adjusts the MCS/bundling size depending on the UL path loss. Thus, in this embodiment, the MTC UE 803C does not need to calculate the CSI and to provide the CSI to the eNB 805C. As shown in FIG. 8C, the MTC UE 803C sends an UL transmission 851 to the eNB 805C. Based on the UL transmission, the eNB 805C determines 853 an MCS and/or a TTI bundling size. The eNB 805C then transmits data 855 to the MTC UE 803C. This data transmission received by the MTC UE 803C has an MCS and/or a TTI bundling size determined based on the UL transmission. Because the eNB 805C is determining the MCS based on an UL channel estimation rather than a DL channel estimation, the third exemplary method may be used only for TDD (the UL channel estimation is based on the same subcarriers as a DL channel estimation).

In one configuration, the eNB 805C receives an uplink transmission from the MTC UE 803C, and determines an MCS based on the received uplink transmission and/or a TTI bundling size based on the received uplink transmission. The eNB 805C sends a data transmission to the MTC UE 803C with the determined MCS and/or the determined TTI bundling size.

FIG. 8D is a diagram 870 for illustrating a fourth exemplary method. During an initial connection set up (e.g., in a RACH procedure), an MTC UE 803D may convey CSI to the eNB 805D. The MTC UE 803D receives reference signals 871 from an eNB 805D. Based on the reference signals 871, the MTC UE 803D estimates a channel between the eNB 805D and the MTC UE 803D. The MTC UE 803D then determines 873 CSI that corresponds to the estimated channel between the eNB 805D and the MTC UE 803D. The MTC UE 803D may estimate the channel in each of multiple subframes. The MTC UE 803D may average the channel estimate over the multiple subframes. After determining the CSI, the MTC UE 803D determines 875 whether to send the CSI to the eNB 805D based on a threshold T2 and/or a timer. For example, if the CSI differs from a reference CSI by more than the threshold T2 ($D_{CSI}$>T2, where $D_{CSI}$ is the difference between the reference CSI and the CSI), the MTC UE 803 may send the CSI to the eNB 805D. In other words, if a difference between the CSI and the reference CSI is greater than the threshold T2, the MTC UE 803D may determine to send the CSI to the eNB 805D. In another example, the MTC UE 803D may set a timer upon sending CSI. When the timer expires, the MTC UE 803D may determine to send the CSI to the eNB 805D. The MTC UE 803D may utilize both the threshold T2 and the timer. In such a configuration, the MTC UE 803D determines to send the CSI when the difference between the CSI and the reference CSI is greater than the threshold T2, and upon expiration of the timer, even if the difference between the CSI and the reference CSI is not greater than the threshold T2. If the MTC UE 803D determines to send, the MTC UE 803 sends the CSI 877 to the eNB 805D. The MTC UE 803D may send the CSI 877 in a MAC header. According to the fourth exemplary method, the MTC UE 803D may provide CSI feedback only when the CSI feedback is needed and/or upon expiration of a timer (e.g., when the CSI differs from the reference CSI by more than the threshold T2 and/or the timer expires). Providing CSI feedback only when needed or infrequently based on a timer saves power and UL resources.

The MTC UE 803D's determination to send the CSI to the eNB 805D based on the threshold T2 may depend on a difference between the CSI and the reference CSI. The CSI may include a CQI, an RI, a PMI, an MCS, and/or path loss. Thus, the CSI may correspond to a CQI index. For example, assume that the CSI corresponds to a CQI index of 4 and the reference CSI corresponds to a CQI index of 8. Then, the difference between the CSI with the CQI index of 4 and the reference CSI with the CQI index of 8 is 4. In a first scenario, if the threshold T2 is less than or equal to 3, the threshold T2 is less than the difference between the CSI with the CQI index of 4 and the reference CSI with the CQI index of 8. Therefore, the MTC UE 803D determines that the difference between the CSI and the reference CSI is greater than the threshold T2, and thus the CSI significantly deviates from the reference CSI. As a result, in the first scenario, the MTC UE 803D determines to send the CSI to the eNB 805D. On the other hand, in a second scenario, if the threshold T2 is greater than or equal to 5, then the MTC UE 803D determines that the CSI does not significantly deviate from the reference CSI because the difference between the CSI with the CQI index of 4 and the reference CSI with the CQI index of 8 is not greater than the threshold T2. Therefore, in the second scenario, the MTC UE 803D determines not to send the CSI to the eNB 805D.

In one example, reference CSI may be CSI that the UE 803D has previously reported to the eNB 805D prior to determining the CSI at 873. For example, prior to determining the CSI at 873, the MTC UE 803D may determine CSI based on previously received reference signals received from the eNB 805D and report the reference CSI to the eNB 805D. Thus, when the previously reported CSI is used as the reference CSI, the reference CSI varies depending on the reference signals received from the eNB 805D. In another example, the reference CSI may be a fixed CSI that includes a fixed value as the reference CSI. In another example, the reference CSI may be based on path loss (e.g., DL path loss). In an aspect, a difference between a current path loss and a reference path loss (e.g. path loss included in the reference CSI) may be included in the CSI as the path loss information.

In another example, the MTC UE 803D may determine the reference CSI based on an MCS of a data transmission received from the eNB 805D. The reference CSI may be determined based on a mapping between an MCS and a CSI. For example, reference CSI with a CQI index of 4 may correspond to QPSK with a code rate of 0.03, and reference CSI with a CQI index of 8 may correspond to 16 QAM with a code rate of 0.48. Thus, if an MCS of a data transmission received from the eNB 805D is 16 QAM with a code rate of approximately 0.48, then the MTC UE 803D determines that the reference CSI corresponds to the CQI index of 8.

As discussed supra, the MTC UE 803D may perform long-term averaging of the channel, but send the CSI to the eNB 805D only if the CSI significantly deviates from the reference CSI. Accordingly, the MTC UE 803D may average the channel between the eNB 805D and the MTC UE 803D over multiple subframes, and send CSI feedback only if the reference CSI and the CSI differ by the threshold T2. Thus, the CSI feedback is event driven. In an example where the threshold T2 is set to 4 and reference CSI corresponds to a CQI index of 8, if the MTC UE 803D determines the CSI with a CQI index of 15, the MTC UE 803D may determine to send CSI feedback to the eNB 805D because the CSI's CQI index is significantly better (i.e., CQI index 15–CQI index 8≥4) than the reference CSI's CQI index of 8. For another example, if the MTC UE 803D determines the CSI with a CQI index of 3, the MTC UE 803D may determine to send CSI feedback to the eNB 805D because the CSI's CQI index is significantly worse (i.e., CQI index 8–CQI index 3≥4) than the reference CSI's CQI index of 8.

Once the MTC UE 803D determines to send CSI feedback to the eNB 805D, the MTC UE 803D may store the CSI feedback until the next UL transmission. In a first configuration, the MTC UE 803D may include the CSI in a MAC header within a scheduled UL data (PUSCH) transmission sent to the eNB 805D. In a second configuration, if there is no scheduled PUSCH transmission, but the MTC UE 803D has a BSR to transmit to the eNB 805D (i.e., the MTC UE 803D has data to transmit), the MTC UE 803D may send the CSI in a MAC header with a UL PUSCH transmission including the BSR. The BSR indicates to the eNB 805D an amount of data in the buffer of the MTC UE 803D. If the MTCH UE 803D has a BSR to send to the eNB 805D, the MTC UE 803D will send a SR to the eNB 805D requesting UL resources for sending the BSR. In the second configuration, the MTC UE 803D sends the CSI and BSR in the resources allocated for the BSR.

In a third configuration, if the MTC UE 803D has no scheduled UL transmission (e.g., PUSCH transmission) and has no BSR to transmit to the eNB 805D, the MTC UE 803D may send an SR or perform a RACH procedure in order to send updated CSI to the eNB 805D. In the third configuration, the MTC UE 803D may send a request to the eNB 805D for sending the CSI upon determining to send the CSI based on the timer and/or the threshold T2. The MTC UE 803D may receive a response from the eNB 805D based on the request and send the CSI based on the received response. The response may be a UL grant. Subsequently, the MTC UE 803D may send the CSI in a scheduled PUSCH of the UL grant. The MTC UE 803D may send the CSI in the MAC header of the scheduled PUSCH of the UL grant or in a payload portion of the scheduled PUSCH of the UL grant. In one aspect, the MTC UE 803D may send the CSI in message 3 (msg3) or message 5 (msg5) of the RACH procedure. In one configuration, the request may be an SR and the received response may be a UL grant. Thus, for example, when the CSI differs from the reference CSI by more than the threshold T2 and/or the timer expires, the MTC UE 803D has no scheduled PUSCH transmission, and the MTC UE 803D has no BSR to transmit to the eNB 805D, an SR may be triggered to request the eNB 805D to provide UL resources for sending the CSI. In another configuration, the request and response may be associated with a RACH procedure. The response received at the MTC UE 803D may be a UL grant. Accordingly, the request may be a random access preamble and the response may be a random access response. Thus, for example, when the CSI differs from the reference CSI by more than the threshold T2 and/or the timer expires, the MTC UE 803D has no scheduled PUSCH transmission, and the MTC UE 803D has no BSR to transmit to the eNB 805D, the MTC UE 803D may perform a RACH procedure and send a random access preamble to the eNB 805D. The MTC UE 803D may then receive a random access response from the eNB 805D. Based on the received random access response, the MTC UE 803D may send the CSI to the eNB 805D. In yet another configuration, the MTC UE 803D may select a RACH format for a RACH procedure based on the CSI and indicate the CSI to the eNB 805D through the selected RACH format in a RACH procedure. The MTC UE 803D may indicate the CSI through a selected RACH format in the random access preamble and/or through a selected RACH format in the response to the random access response.

In a fourth configuration, the MTC UE 803D may send the CSI to the eNB 805D through an aperiodic CQI transmission. In the fourth configuration, the MTC UE 803D receives a UL grant from the eNB 805D, and the UL grant specifically indicates that CSI is to be sent in the allocated UL resources. The MTC UE 803D transmits the CSI feedback in the allocated UL resources.

In a fifth configuration, if there is no UL transmission, the eNB 805D may occasionally send a UL grant to the MTC UE 803D for sending CSI feedback.

Thus, when the MTC UE 803D has not sent CSI for a time period greater than a threshold time period, the eNB 805D may send a UL grant. The MTC UE 803D may receive the UL grant from the eNB 805D and send CSI to the eNB 805D based on the received UL grant from the eNB 805D. This procedure may be tied to a supervision procedure.

There are several approaches for reporting CSI feedback. In a first approach, the MTC UE 803D may determine the CSI based on a lowest quality channel estimate over multiple subframes and report the worst CSI (for power optimization). In a second approach, the MTC UE 803D may determine the CSI based on an average of the estimated channels over multiple frames and report the average CSI (for spectral efficiency optimization). In a third approach, the MTC UE 803D may determine both worst case and average CSI and report both the worse case and average CSI (for eNB scheduling flexibility). In a fourth approach, the MTC UE 803D may determine the CSI based on one estimate of the channel among the estimated channels of the multiple subframes. In a fifth approach, the MTC UE 803D may receive a configuration indicating how to determine the CSI, and then determine the CSI based on the received configuration. The configuration may indicate to the MTC UE 803D to use one of the first through fourth approaches, or may indicate to the MTC UE 803D to use a different approach for reporting CSI feedback.

If an MBSFN broadcast is used for data transmission, the MTC UE 803D may receive information indicating MBSFN subframes, and determine the CSI based on the received information. Thus, the MTC UE 803D may be notified of subframes that are transmitted using multicast/broadcast, and the MTC UE 803D may treat the CSI feedback differently for those subframes. For example, if the MTC UE 803D receives multicast/broadcast data, CSI feedback determined based on the received multicast/broadcast data may better than CSI feedback determined based on a received unicast data. Accordingly, the MTC UE 803D may adjust or ignore channel estimates based on multicast/broadcast data.

If a decoupled DL and UL operation is used for the MTC UE 803D, one cell in the eNB 805D may be dedicated for DL while another cell in eNB 805D may be dedicated for UL. In this case, the MTC UE 803D may receive the data from a first cell of the eNB 805D and send CSI to a second cell of the eNB 805D, where the second cell is different from the first cell. The first cell of the eNB 805D may be a DL serving cell, and the second cell of the eNB 805D may be a UL serving cell.

As discussed supra, the MTC UE 803D may select a RACH format for a RACH procedure based on the CSI. The MTC UE 803D sends the CSI through the RACH procedure and indicates the CSI through the selected RACH format. In other words, the MTC UE 803D may choose a RACH format (e.g., a different length of a RACH bundle) to indicate to the eNB 805D its radio condition, such that the format of RACH indicates the CSI to the eNB 805D. For example, if the channel is in a poor condition, the MTC UE 803D may select a RACH with a longer transmission time. This RACH format of the longer transmission time indicates to the eNB 805D that the channel is in a poor condition. On the other hand, for example, if the channel is in a good condition, the MTC UE 803D may select a compact RACH channel, and this RACH format indicates to the eNB 805D that the channel is in a good condition. Depending on the RACH format, the eNB 805D may select an appropriate MCS and a bundling size for a subsequent DL transmission (e.g., msg2 with bundling).

For an initial RACH procedure, the MTC UE 803D measures the DL path loss, and depending on the path loss, selects one of multiple RACH sequences/signatures (also referred to as format). If the MTC UE 803D selects a normal RACH transmission, then subsequent transmissions by the MTC UE 803D (msg3 and msg5) and the eNB 805D (msg2 and msg4) do not use TTI bundling. If the MTC UE 803D selects a bundled RACH transmission with long TTI, then subsequent transmissions by the MTC UE 803D (msg3 and msg5) and the eNB 805D (msg2 and msg4) use the lowest MCS (e.g., BPSK) with TTI bundling.

The CSI feedback may be combined with other reports. In one approach, the MTC UE 803D may receive a periodic supervision message from the eNB 805D, and send a response to the eNB 805D based on the received periodic supervision message, where the CSI is sent with the response. A periodic supervision may be needed to determine whether the MTC UE 803D is accessible or whether the MTC UE 803D is out of coverage or out of service (e.g., due to a bad battery). Thus, by sending a periodic supervision message to the MTC UE 803D and receiving a response from the MTC UE 803D, the eNB 805D can determine whether the MTC UE 803D is alive. For example, eNB 805D may send a periodic supervision message, and if the MTC UE 803D sends back an acknowledgement in response to the request, the eNB 805D may determine that the MTC UE 803D is accessible. MTC UE 803D may also send CSI feedback with the acknowledgement to the supervision request.

In another approach for combining the CSI with other reports, the MTC UE 803D may determine an RSRQ and/or an RSRP, and send the RSRP and/or the RSRQ to the eNB 805D, where the CSI is sent with the RSRP and/or the RSRQ. Thus, according to this approach, the MTC UE 803D may measure the RSRP and/or the RSRQ and then when the MTC UE 803D reports the measured RSRP/RSRQ to the eNB 805D, the MTC UE 803D may combine the CSI report with RSRP/RSRQ reporting and send the combined report to the eNB 805D. The RSRP/RSRQ reporting may be event-driven. Further, the long term CSI reporting may be combined with the RSRP/RSRQ reporting.

Figure 9:
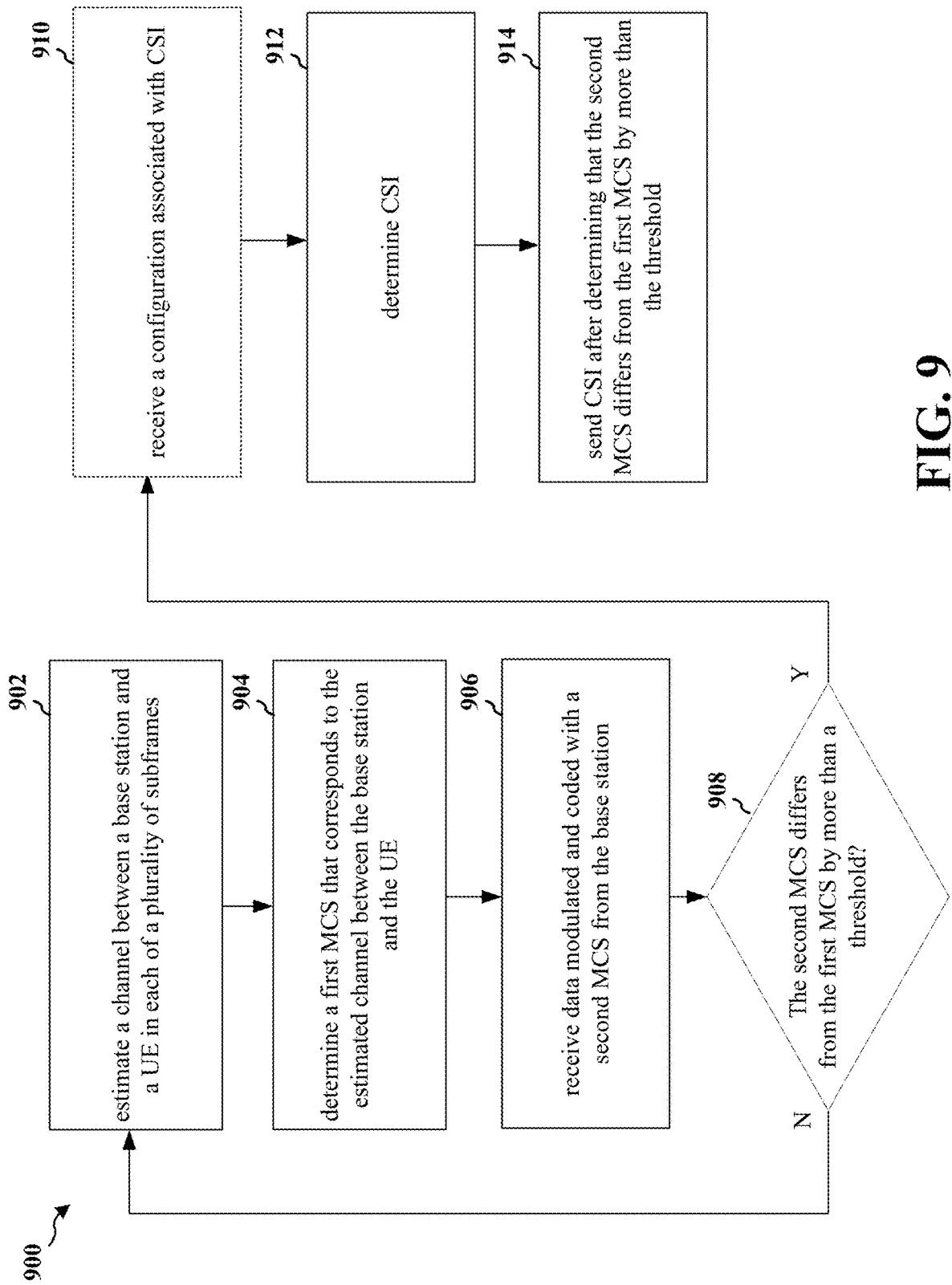
FIG. 9 is a flow chart of a first method of wireless communication.

FIG. 9 is a flow chart 900 of a first method of wireless communication. The method may be performed by a UE. At step 902, the UE estimates a channel between a base station and a UE in each of a plurality of subframes. The channel may be averaged over a plurality of subframes. At step 904, the UE determines a first MCS that corresponds to the estimated channel between the base station and the UE. At step 906, the UE receives data modulated and coded with a second MCS from the base station. At step 908, the UE determines whether the second MCS differs from the first MCS by more than a threshold. If the UE determines that the second MCS does not differ from the first MCS by more than a threshold, the UE goes back to step 902. If the UE determines that the second MCS differs from the first MCS by more than a threshold, at step 912, the UE may determine the CSI. The UE may determine the CSI in step 912 based on a received configuration in step 910. At step 914, the UE sends the CSI after determining that the second MCS differs from the first MCS by more than the threshold. At step 914, the CSI may be sent in a MAC header within a scheduled UL data transmission. At step 914, the CSI may be sent in a MAC header within an UL transmission with a buffer status report.

For example, referring to FIG. 8A, the MTC UE 803A estimates a channel between the eNB 805A and the MTC UE 803A in each of a plurality of subframes. The channel may be averaged over a plurality of subframes. The MTC UE 803A determines a first MCS that corresponds to the estimated channel between the eNB 805A and the MTC UE 803A. The MTC UE 803A receives data modulated and coded with a second MCS from the eNB 805A. The MTC UE 803A determines whether the second MCS differs from the first MCS by more than a threshold. If the MTC UE 803A determines that the second MCS does not differ from the first MCS by more than a threshold, the MTC UE 803A goes back to estimating of a channel between the eNB 805A and the MTC UE 803A in each of a plurality of subframes. If the MTC UE 803A determines that the second MCS differs from the first MCS by more than a threshold, the MTC UE 803A determines CSI, and then sends the CSI at the next available opportunity according to the CSI feedback method.

In one configuration, the UE sends a request to the base station for sending the CSI upon determining that the second MCS differs from the first MCS by more than the threshold, and receives a response from the base station based on the request. The UE may send the CSI to the base station based on the received response. The request may be a scheduling request and the response may be an UL grant. The scheduling request may request UL resources for sending the CSI. The UE may send the CSI in the requested UL resources. The request may be a random access preamble and the response may be a random access response.

In one configuration, the UE receives an UL grant from the base station. The UL grant requests the CSI. The UE sends CSI based on the received UL grant. In one configuration, the UE receives an UL grant from the base station. The UL grant is received when CSI is not sent for a time period greater than a threshold. The UE may send the CSI based on the received UL grant. In one configuration, the estimated channel is averaged over a plurality of subframes. In one configuration, the UE estimates the channel in each of a plurality of subframes, and determines the CSI based on a lowest quality channel estimate over the plurality of subframes. In one configuration, the UE estimates the channel in each of a plurality of subframes, and determines the CSI based on an average of the estimated channels over the plurality of subframes. In one configuration, the CSI includes first CSI corresponding to a lowest quality channel estimate and second CSI corresponding to an average channel estimate. In one configuration, the UE estimates the channel in each of a plurality of subframes, and determines the CSI based on one estimate of the channel. In one configuration, the UE receives a configuration indicating how to determine the CSI, and determines the CSI based on the received configuration. In one configuration, the UE receives information indicating MBSFN subframes, and determines the CSI based on the received information. In one configuration, the data is received from a first cell of the base station and the CSI is sent to a second cell different than the first cell of the base station. In one configuration, the UE selects a RACH format for a RACH procedure based on the CSI. The UE sends the CSI through the RACH procedure and indicates the CSI through the selected RACH format. In one configuration, the UE receives a periodic supervision message from the base station, and sends a response to the base station based on the received periodic supervision message. The UE may send the CSI with the response. In one configuration, the UE determines at least one of an RSRQ or an RSRP, and sends the at least one of the RSRP or the RSRQ to the base station. The UE may send the CSI with the at least one of the RSRP or the RSRQ.

Figure 10:
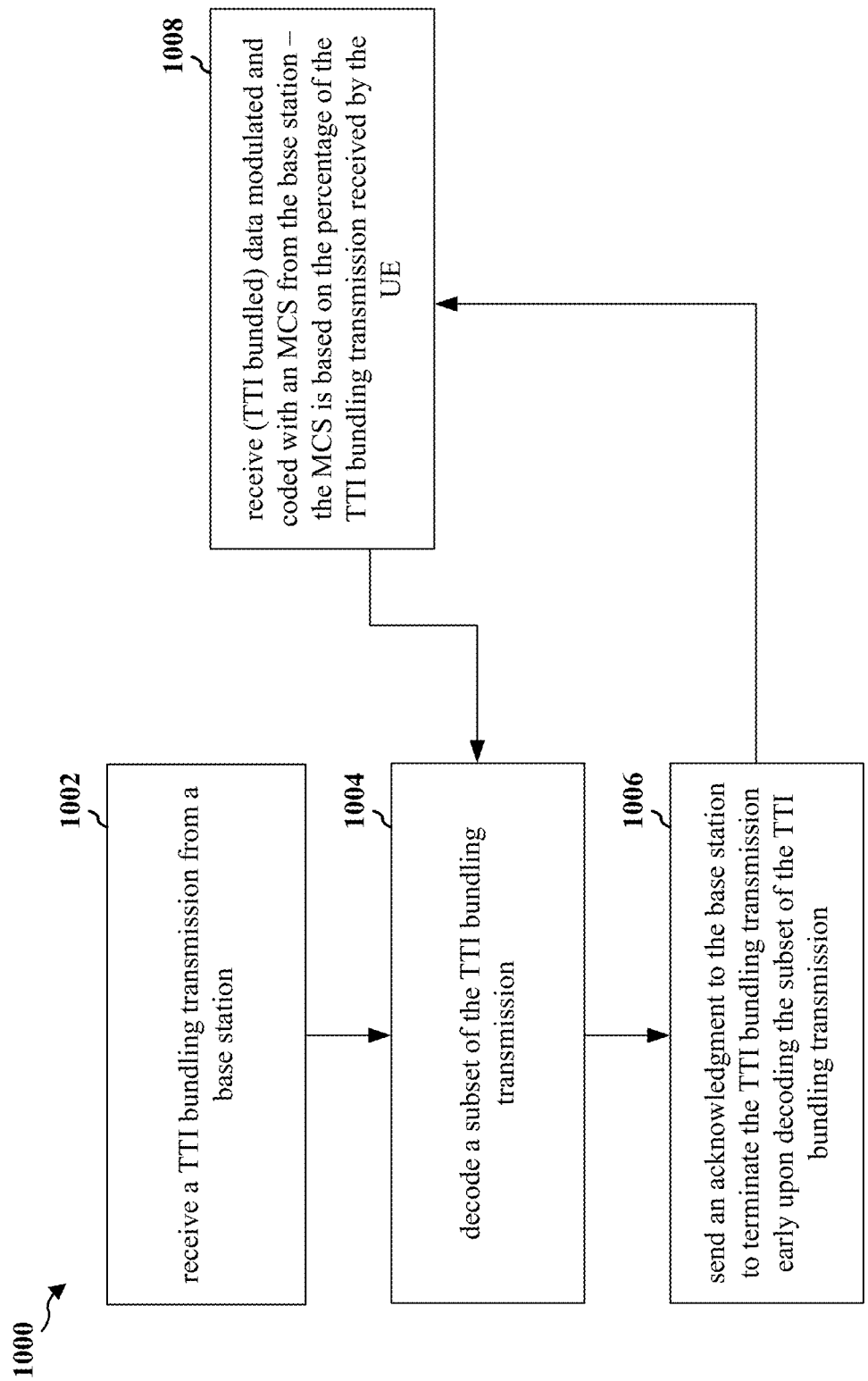
FIG. 10 is a flow chart of a second method of wireless communication.

FIG. 10 is a flow chart 1000 of a second method of wireless communication. The method may be performed by a UE. At step 1002, the UE receives a TTI bundling transmission from a base station. At step 1004, the UE decodes a subset of the TTI bundling transmission. At step 1006, the UE sends an acknowledgment to the base station to terminate the TTI bundling transmission early upon decoding the subset of the TTI bundling transmission. The CSI is indicated to the base station through a percentage of the TTI bundling transmission received by the UE. At step 1008, the UE receives (TTI bundled) data modulated and coded with an MCS from the base station, where the MCS is based on the percentage of the TTI bundling transmission received by the UE. The UE returns to step 1004 to decode a subset of the TTI bundling transmission received at step 1008.

For example, referring to FIG. 8B, the MTC UE 803B receives a TTI bundling transmission from the eNB 805B. The MTC UE 803B decodes a subset of the TTI bundling transmission. The MTC UE 803B sends an acknowledgment to the eNB 805B to terminate the TTI bundling transmission early upon decoding the subset of the TTI bundling transmission. The CSI is indicated to the eNB 805B through a percentage of the TTI bundling transmission received by the MTC UE 803B. The MTC UE 803B receives (TTI bundled) data modulated and coded with an MCS from the eNB 805B, where the MCS is based on the percentage of the TTI bundling transmission received by the MTC UE 803B.

Figure 11:
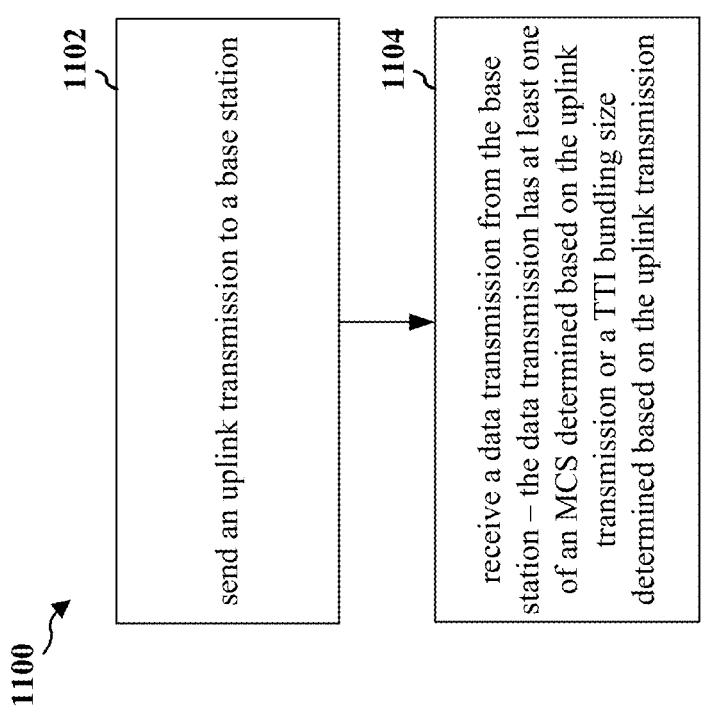
FIG. 11 is a flow chart of a third method of wireless communication.

FIG. 11 is a flow chart 1100 of a third method of wireless communication. The method may be performed by a UE. At step 1102, the UE sends an UL transmission to a base station. At step 1104, the UE receives a data transmission from the base station. The data transmission has at least one of an MCS determined based on the UL transmission or a TTI bundling size determined based on the UL transmission.

For example, referring to FIG. 8C, the MTC UE 803C sends an UL transmission to the eNB 805C. The MTC UE 803C receives a data transmission from the eNB 805C, the data transmission having at least one of an MCS determined based on the UL transmission or a TTI bundling size determined based on the UL transmission.

Figure 12:
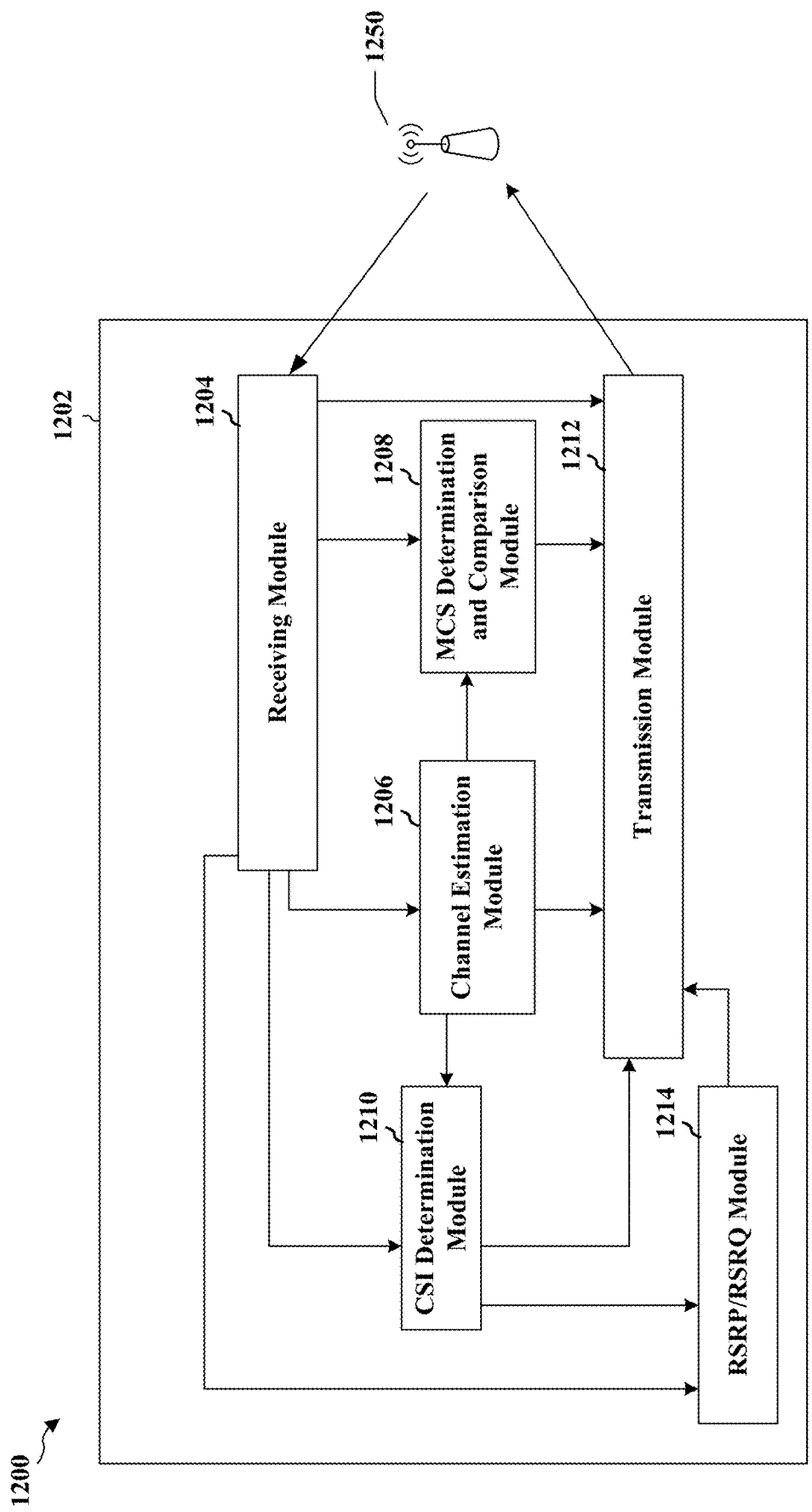
FIG. 12 is a conceptual data flow diagram illustrating the data flow between different modules/means/components in an exemplary apparatus.

FIG. 12 is a conceptual data flow diagram 1200 illustrating the data flow between different modules/means/components in an exemplary apparatus 1202. The apparatus may be a UE. The apparatus includes a receiving module 1204 that is configured to receive data from the base station. The apparatus further includes a channel estimation module 1206 that is configured to estimate a channel between the base station and the UE in each of a plurality of subframes. The estimated channel may be averaged over a plurality of subframes. The apparatus further includes a MCS determination and comparison module 1208 that is configured to determine a first MCS that corresponds to the estimated channel between the base station and the UE. The MCS determination and comparison module 1208 is configured to determine a second MCS, and to determine whether the second MCS differs from the first MCS by more than a threshold. The apparatus further includes a CSI determination module 1210 that is configured to determine the CSI. The CSI determination module 1210 may receive a configuration indicating how to determine the CSI, and determine the CSI based on the received configuration. In particular, the CSI determination module 1210 may be configured to determine the CSI based on a lowest quality channel estimate over the plurality of subframes. The CSI determination module 1210 may also be configured to determine the CSI based on an average of the estimated channels over the plurality of subframes. The CSI determination module 1210 may also be configured to determine the CSI that includes first CSI corresponding to a lowest quality channel estimate and second CSI corresponding to an average channel estimate. The CSI determination module 1210 may also be configured to determine the CSI based on one estimate of the channel. The CSI determination module 1210 may also be configured to receive information indicating MBSFN subframes, and to determine the CSI based on the received information. Further, the data may be received from a first cell of the base station and the CSI may be sent to a second cell different than the first cell of the base station.

The apparatus further includes a transmission module 1212 that is configured to send the CSI after determining that the second MCS differs from the first MCS by more than the threshold. The transmission module 1212 may also be configured to send the CSI in a MAC header within a scheduled UL data transmission and/or to send the CSI in a MAC header with an UL transmission with a buffer status report. The transmission module 1212 may also be configured to send a request to the base station for sending the CSI upon determining that the second MCS differs from the first MCS by more than the threshold, and the receiving module 1204 may also be configured to receive a response from the base station based on the request, where the CSI is sent to the base station based on the received response. The request may be a scheduling request and the response may be an UL grant. The scheduling request may request UL resources for sending the CSI, where the CSI is sent in the requested UL resources via the transmission module 1212. The request may also be a random access preamble and the response may be a random access response. The receiving module 1204 may also configured to receive an UL grant from the base station, the UL grant requesting the CSI, where the CSI is sent based on the received UL grant. The receiving module 1204 may also configured to receive an UL grant from the base station, the UL grant being received when CSI is not sent for a time period greater than a threshold, where the CSI is sent based on the received UL grant.

The transmission module 1212 may also be configured to select a RACH format for a RACH procedure based on the CSI, where the CSI is sent through the RACH procedure and is indicated through the selected RACH format. The receiving module 1204 may also be configured to receive a periodic supervision message from the base station, and the transmission module 1212 may be configured to a response to the base station based on the received periodic supervision message. In an aspect, the CSI may be sent with the response. The apparatus further includes an RSRP/RSRQ module 1214 that is configured to determining at least one of an RSRQ or an RSRP, and the transmission module 1212 may be configured to send the at least one of the RSRP or the RSRQ to the base station. In such an aspect, the CSI may be sent with the at least one of the RSRP or the RSRQ.

Figure 13:
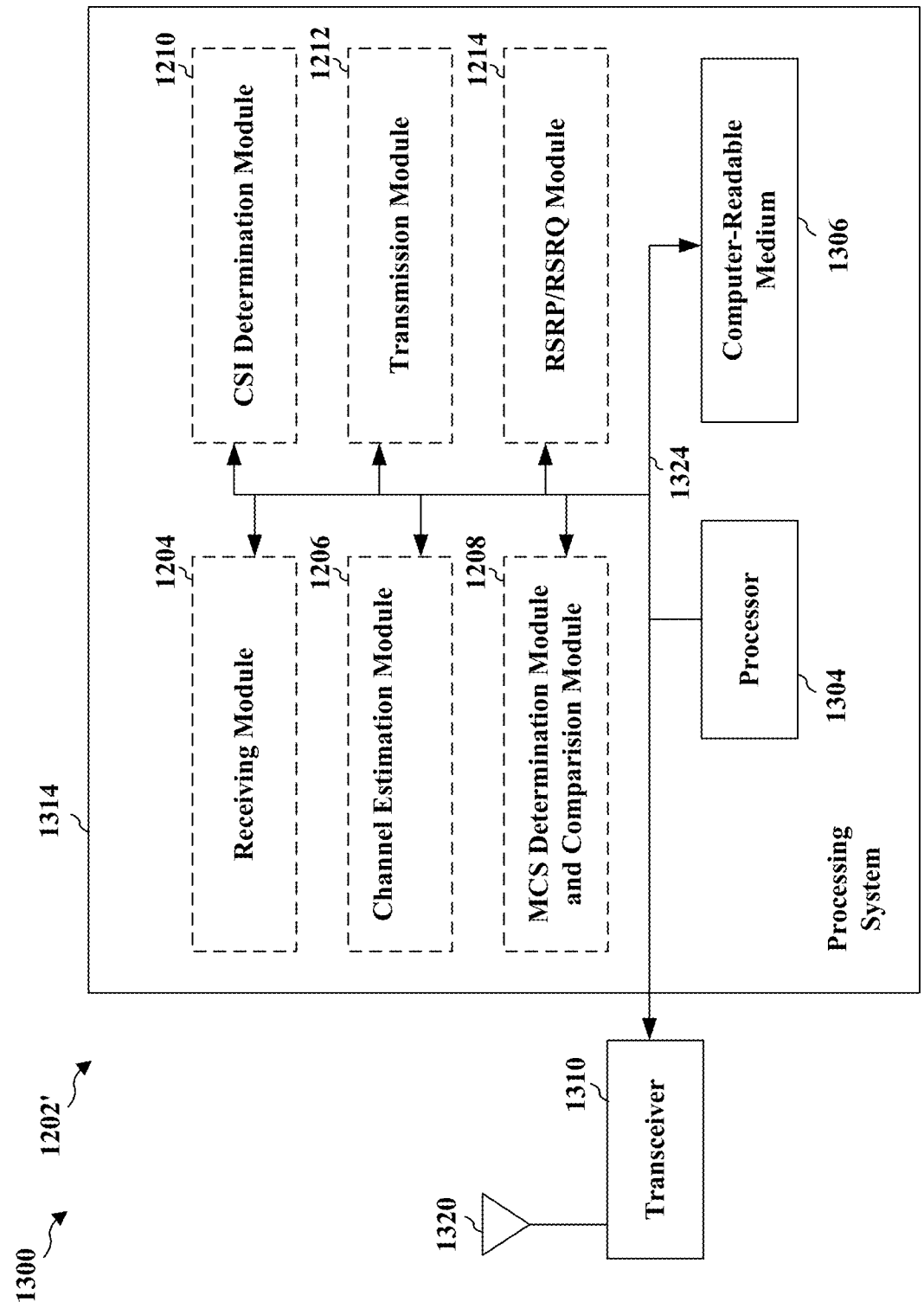
FIG. 13 is a diagram illustrating an example of a hardware implementation for an apparatus employing a processing system.

The apparatus may include additional modules that perform each of the steps of the algorithm in the aforementioned flow charts of FIGS. 8A and 9. As such, each step in the aforementioned flow charts of FIGS. 8A and 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1204, 1206, 1208, 1210, 1212, and 1214 and the computer-readable medium 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the receiving module 1204. In addition, the transceiver 1310 receives information from the processing system 1314, specifically the transmission module 1212, and based on the received information, generates a signal to be applied to the one or more antennas 1320. The processing system 1314 includes a processor 1304 coupled to a computer-readable medium 1306. The processor 1304 is responsible for general processing, including the execution of software stored on the computer-readable medium 1306. The software, when executed by the processor 1304, causes the processing system 1314 to perform the various functions described supra for any particular apparatus. The computer-readable medium 1306 may also be used for storing data that is manipulated by the processor 1304 when executing software. The processing system further includes at least one of the modules 1204, 1206, 1208, 1210, 1212, and 1214. The modules may be software modules running in the processor 1304, resident/stored in the computer readable medium 1306, one or more hardware modules coupled to the processor 1304, or some combination thereof. The processing system 1314 may be a component of the UE 650 and may include the memory 660 and/or at least one of the TX processor 668, the RX processor 656, and the controller/processor 659.

In one configuration, the apparatus 1202/1202' for wireless communication includes means for determining a first MCS that corresponds to an estimated channel between a base station and the UE, means for receiving data modulated and coded with a second MCS from the base station, means for determining whether the second MCS differs from the first MCS by more than a threshold, and means for sending CSI after determining that the second MCS differs from the first MCS by more than the threshold. The apparatus may further include means for sending a request to the base station for sending the CSI upon determining that the second MCS differs from the first MCS by more than the threshold, and means for receiving a response from the base station based on the request. The CSI is sent to the base station based on the received response. The apparatus may further include means for estimating the channel in each of a plurality of subframes, and means for determining the CSI based on a lowest quality channel estimate over the plurality of subframes. The apparatus may further include means for estimating the channel in each of a plurality of subframes, and means for determining the CSI based on an average of the estimated channels over the plurality of subframes. The apparatus may further include means for estimating the channel in each of a plurality of subframes, and means for determining the CSI based on one estimate of the channel. The apparatus may further include means for receiving a configuration indicating how to determine the CSI, and means for determining the CSI based on the received configuration. The apparatus may further include means for receiving information indicating MBSFN subframes, and means for determining the CSI based on the received information. The apparatus may further include means for receiving a periodic supervision message from the base station, and means for sending a response to the base station based on the received periodic supervision message. The CSI is sent with the response. The apparatus may further include means for determining at least one of an RSRQ or an RSRP, and means for sending the at least one of the RSRP or the RSRQ to the base station. The CSI is sent with the at least one of the RSRP or the RSRQ. The aforementioned means may be one or more of the aforementioned modules of the apparatus 1202 and/or the processing system 1314 of the apparatus 1202' configured to perform the functions recited by the aforementioned means. As described supra, the processing system 1314 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 14:
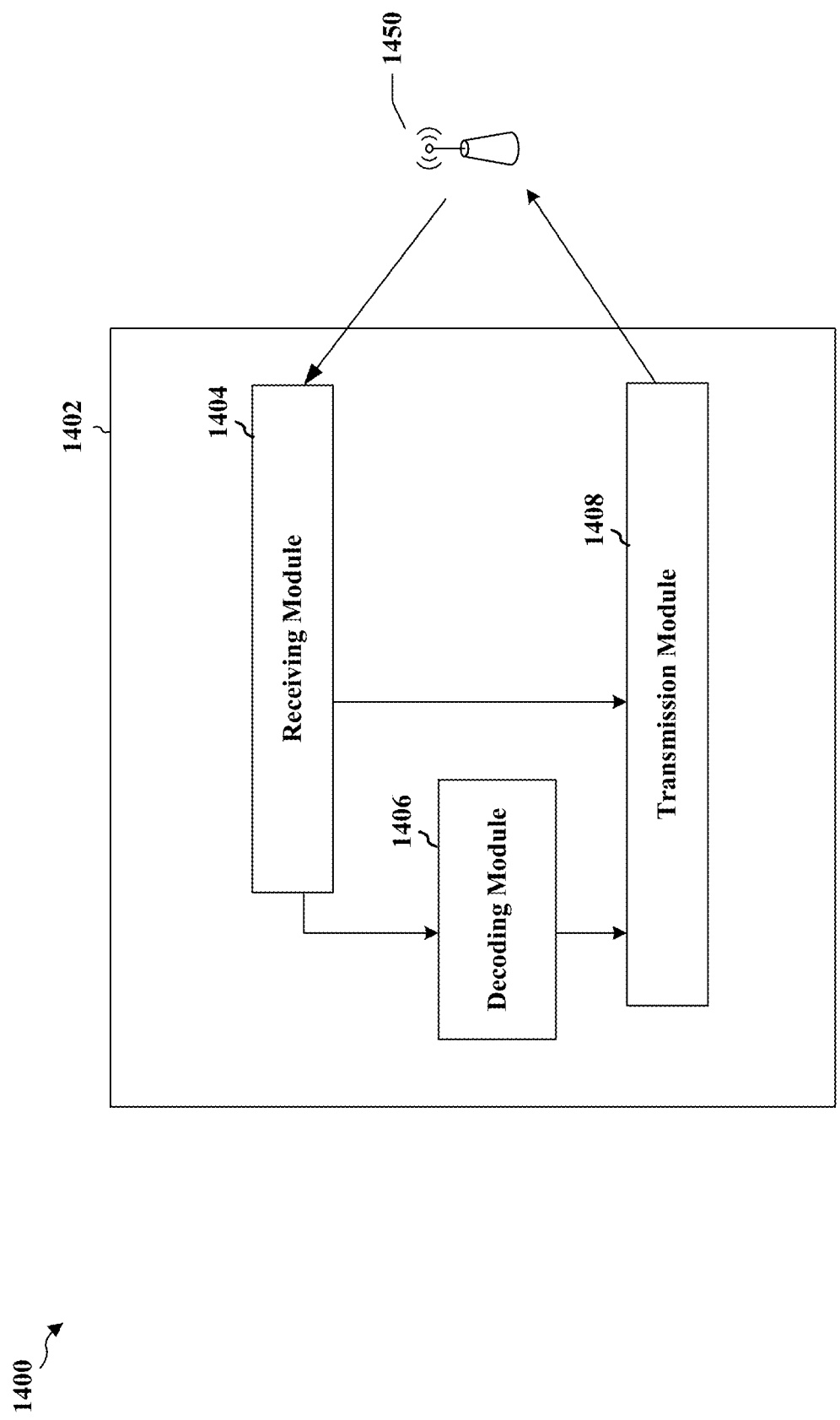
FIG. 14 is a conceptual data flow diagram illustrating the data flow between different modules/means/components in an exemplary apparatus.

FIG. 14 is a conceptual data flow diagram 1400 illustrating the data flow between different modules/means/components in an exemplary apparatus 1402. The apparatus may be a UE. The apparatus includes a receiving module 1404 that is configured to receive a TTI bundling transmission from a base station. The apparatus further includes a decoding module 1406 that is configured to decode a subset of the TTI bundling transmission. The apparatus further includes a transmission module 1408 that is configured to send an acknowledgment to the base station to terminate the TTI bundling transmission early upon decoding the subset of the TTI bundling transmission. The CSI is indicated to the base station through a percentage of the TTI bundling transmission received by the UE. The receiving module 1404 may be configured to receive data modulated and coded with an MCS from the base station, where the MCS is based on the percentage of the TTI bundling transmission received by the UE.

Alternatively, the transmission module 1408 may be configured to send an UL transmission to a base station, and the receiving module 1404 may be configured to receive a data transmission from the base station, the data transmission having at least one of an MCS determined based on the UL transmission or a TTI bundling size determined based on the UL transmission.

Figure 15:
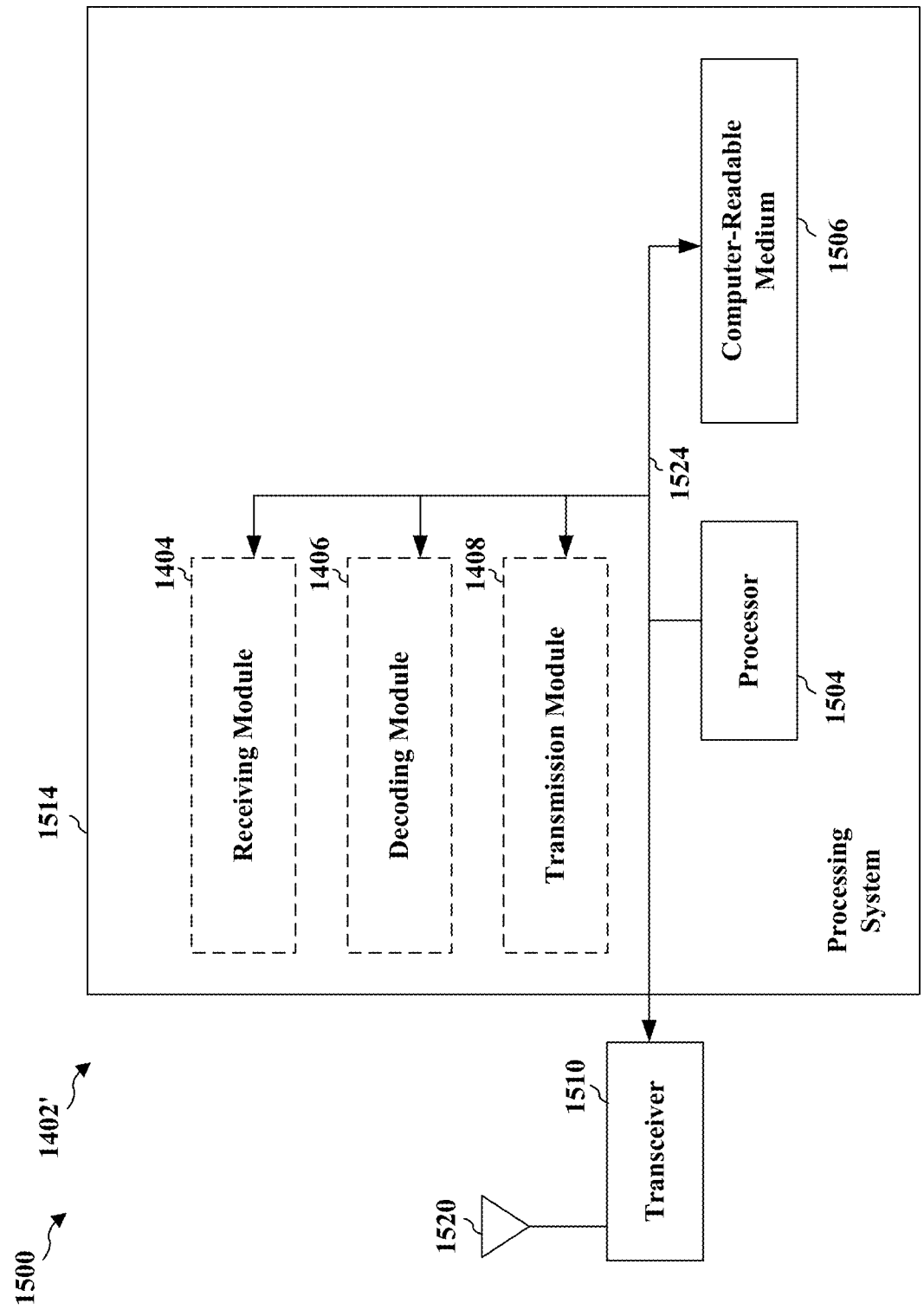
FIG. 15 is a diagram illustrating an example of a hardware implementation for an apparatus employing a processing system.

The apparatus may include additional modules that perform each of the steps of the algorithm in the aforementioned flow charts of FIGS. 8B, 8C, 10, and 11. As such, each step in the aforementioned flow charts of FIGS. 8B, 8C, 10, and 11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof FIG. 15 is a diagram 1300 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware modules, represented by the processor 1504, the modules 1404, 1406, and 1408, and the computer-readable medium 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the receiving module 1404. In addition, the transceiver 1510 receives information from the processing system 1514, specifically the transmission module 1408, and based on the received information, generates a signal to be applied to the one or more antennas 1520. The processing system 1514 includes a processor 1504 coupled to a computer-readable medium 1506. The processor 1504 is responsible for general processing, including the execution of software stored on the computer-readable medium 1506. The software, when executed by the processor 1504, causes the processing system 1514 to perform the various functions described supra for any particular apparatus. The computer-readable medium 1506 may also be used for storing data that is manipulated by the processor 1504 when executing software. The processing system further includes at least one of the modules 1404, 1406, and 1408. The modules may be software modules running in the processor 1504, resident/stored in the computer readable medium 1506, one or more hardware modules coupled to the processor 1504, or some combination thereof. The processing system 1514 may be a component of the UE 650 and may include the memory 660 and/or at least one of the TX processor 668, the RX processor 656, and the controller/processor 659.

In one configuration, the apparatus 1402/1402' for wireless communication includes means for receiving a TTI bundling transmission from a base station, means for decoding a subset of the TTI bundling transmission, and means for sending an acknowledgment to the base station to terminate the TTI bundling transmission early upon decoding the subset of the TTI bundling transmission, where CSI is indicated to the base station through a percentage of the TTI bundling transmission received by the UE. The apparatus may further include means for receiving data modulated and coded with an MCS from the base station. The MCS is based on the percentage of the TTI bundling transmission received by the UE.

In another configuration, the apparatus 1402/1402' for wireless communication includes means for sending an UL transmission to a base station, and means for receiving a data transmission from the base station, the data transmission having at least one of an MCS determined based on the UL transmission or a TTI bundling size determined based on the UL transmission. The aforementioned means may be one or more of the aforementioned modules of the apparatus 1402 and/or the processing system 1514 of the apparatus 1402' configured to perform the functions recited by the aforementioned means. As described supra, the processing system 1514 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 16:
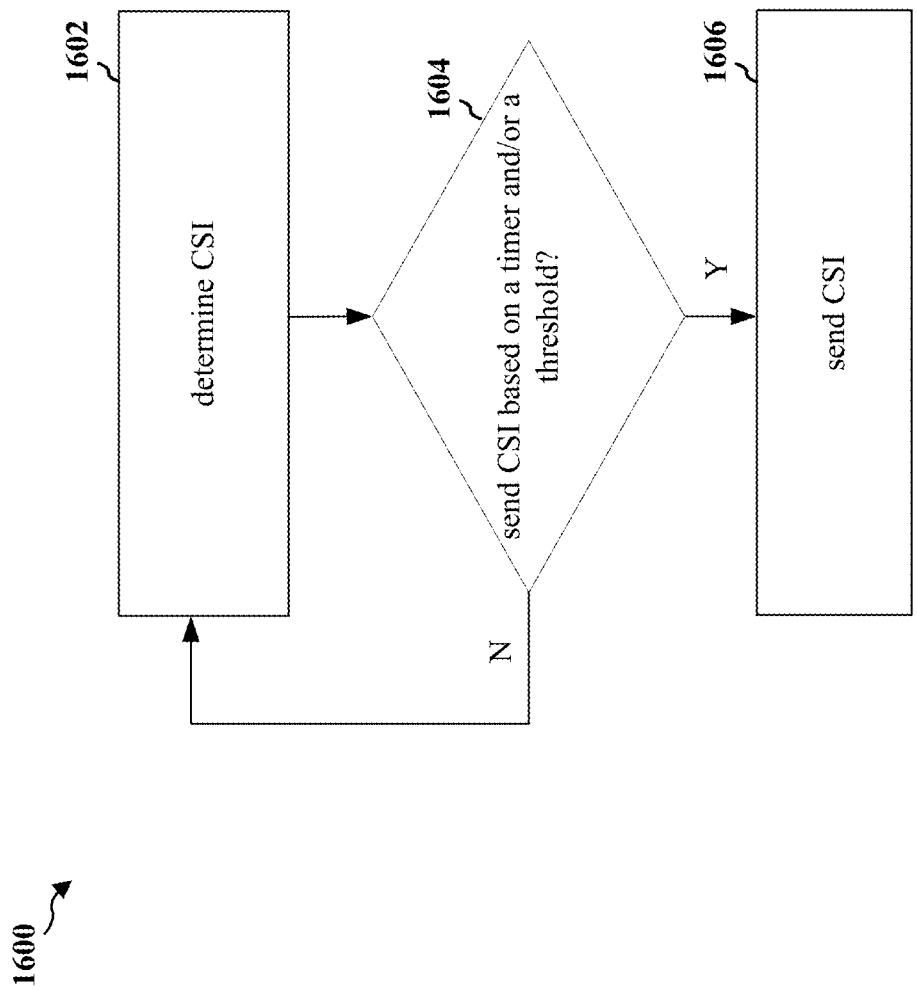
FIG. 16 is a flow chart of a fourth method of wireless communication.

FIG. 16 is a flow chart 1600 of a fourth method of wireless communication. The method may be performed by a UE. At step 1602, the UE determines CSI. The CSI may be determined over multiple subframes. At step 1604, the UE determines whether to send the CSI based on a timer and/or a threshold. If the UE determines not to send the CSI, the UE goes back to step 1602. If the UE determines to send the CSI, at step 1606, the UE sends the CSI. The UE may send the CSI in a MAC header upon determining to send the CSI. In an aspect, the CSI may include at least one of a CQI, an RI, a PMI, an MCS, or path loss. The UE's determination to send the CSI based the threshold in step 1604 may depend on a difference between the CSI and reference CSI. The reference CSI may be determined based on at least one of previously reported CSI, fixed CSI, path loss, or an MCS of a received data transmission from a base station. The UE may send CSI to the base station in an initial connection setup with the base station.

For example, referring to FIG. 8D, the MTC UE 803D estimates a channel between the eNB 805D and the MTC UE 803D. The MTC UE 803D then determines 873 CSI that corresponds to the estimated channel between the eNB 805D and the MTC UE 803D. The MTC UE 803D determines whether to send the CSI to the eNB 805D based on a threshold T2 and/or a timer. For example, if a difference between the CSI and reference CSI is greater than the threshold T2 and/or the timer expires, the MTC UE 803D may determine to send the CSI to the eNB 805D. The reference CSI may be CSI that the UE 803D has previously reported to the eNB 805D prior to determining the CSI. The reference CSI may be a fixed CSI that includes a fixed value as the reference CSI. The reference CSI may be determined based on an MCS of a data transmission received from the eNB 805D. If the MTC UE 803D determines to send the CSI to the eNB 805D, the MTC UE 803 sends the CSI to the eNB 805D in a MAC header.

In one configuration, the UE sends a request to the base station for sending the CSI, and receives a response from the base station based on the request. In an aspect, the UE may send the CSI to the base station based on the received response. The request may be a scheduling request or a RACH message and the response is a UL grant. In an aspect, the UE sends the CSI in a scheduled PUSCH of the UL grant. The UE may send the CSI in message 3 or message 5 of a RACH procedure.

In one configuration, the UE receives an UL grant from the base station when CSI is not sent for a time period greater than a threshold. In an aspect, the UE may send the CSI based on the received UL grant. In one configuration, the estimated channel is averaged over multiple subframes. In one configuration, the UE estimates the channel in each of multiple subframes, and determines the CSI based on a lowest CSI over the multiple subframes. In one configuration, the UE estimates the channel in each of multiple subframes, and determines the CSI based on an average of the estimated channels over the multiple subframes. In one configuration, the UE receives a configuration indicating how to determine the CSI, and determines the CSI based on the received configuration. In one configuration, the UE receives information indicating MBSFN subframes, and determines the CSI based on the received information. In one configuration, the UE selects a RACH format for a RACH procedure based on the CSI. In an aspect, the UE may send the CSI through the RACH procedure and indicates the CSI through the selected RACH format. In one configuration, the UE receives a periodic supervision message from the base station, and sends a response to the base station based on the received periodic supervision message. In an aspect, the UE may send the CSI with the response. In one configuration, the UE determines at least one of an RSRQ or an RSRP, and sends the at least one of the RSRP or the RSRQ to the base station. In an aspect, the UE may send the CSI with the at least one of the RSRP or the RSRQ. In one configuration, the UE may send the CSI upon expiration of the timer.

Figure 17:
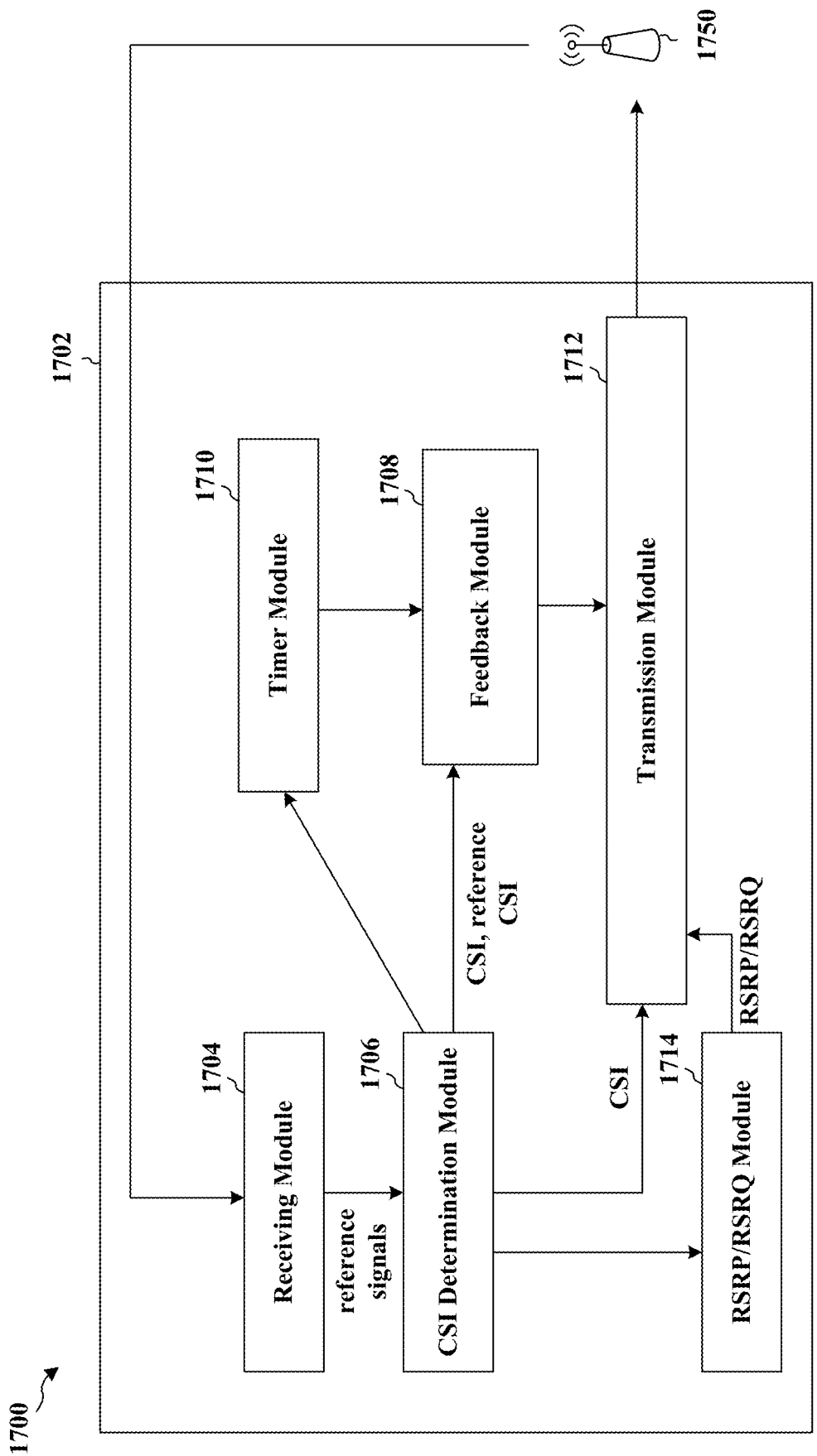
FIG. 17 is a conceptual data flow diagram illustrating the data flow between different modules/means/components in an exemplary apparatus.

FIG. 17 is a conceptual data flow diagram 1700 illustrating the data flow between different modules/means/components in an exemplary apparatus 1702. The apparatus may be a UE. The apparatus includes a receiving module 1704 that is configured to receive reference signals from a base station 1750. The apparatus further includes a CSI determination module 1706 that is configured to determine the CSI. The CSI determination module 1706 may determine the CSI over a plurality of subframes. The CSI determination module 1706 may be configured to estimate the CSI in each of a plurality of subframes, and to determine the CSI based on a lowest CSI over the plurality of subframes or on an average of the estimated CSI over the plurality of subframes. The CSI determination module 1706 may receive a configuration indicating how to determine the CSI, and determine the CSI based on the received configuration. The CSI determination module 1706 may also be configured to receive information indicating MBSFN subframes, and to determine the CSI based on the received information.

The apparatus further includes a feedback module 1708 that is configured to determine whether to send the CSI based on at least one of a timer or a threshold. The apparatus further includes a timer module 1710 to manage the timer. The feedback module 1708 may determine to send the CSI based on the threshold depending on a difference between the CSI and reference CSI. The CSI determination module 1706 may determine the reference CSI based on at least one of previously reported CSI, fixed CSI, path loss, or an MCS of a received data transmission from a base station 1750. The feedback module 1708 may determine to send the CSI upon expiration of the timer indicated by the timer module 1710.

The apparatus further includes a transmission module 1712 that is configured to send the CSI upon determining to send the CSI. The transmission module 1712 may send the CSI in a MAC header upon determining to send the CSI. In an aspect, the CSI may include at least one of a CQI, an RI, a PMI, an MCS, or path loss. The transmission module 1712 may be configured to send CSI to the base station 1750 in an initial connection setup with the base station 1750. The transmission module 1712 may also be configured to send a request to the base station 1750 for sending the CSI, and the receiving module 1704 may also be configured to receive a response from the base station 1750 based on the request, where the CSI is sent to the base station 1750 based on the received response. The request may be a scheduling request or a RACH message and the response may be a UL grant, where the apparatus sends the CSI in a scheduled PUSCH of the UL grant. In an aspect, the transmission module 1712 may send the CSI in message 3 or message 5 of a RACH procedure. The transmission module 1712 may also be configured to select a RACH format for a RACH procedure based on the CSI, where the CSI is sent through the RACH procedure and is indicated through the selected RACH format. The receiving module 1704 may also be configured to receive a periodic supervision message from the base station 1750, and the transmission module 1712 may be configured to send a response to the base station 1750 based on the received periodic supervision message, where the CSI is sent with the response. The apparatus further includes an RSRP/RSRQ module 1714 that is configured to determine at least one of an RSRQ or an RSRP, and the transmission module 1712 may be configured to send the at least one of the RSRP or the RSRQ to the base station 1750, where the CSI is sent with the at least one of the RSRP or the RSRQ. The receiving module 1704 may also configured to receive an UL grant from the base station 1750, the UL grant being received when CSI is not sent for a time period greater than a second threshold, where the CSI is sent based on the received UL grant.

Figure 18:
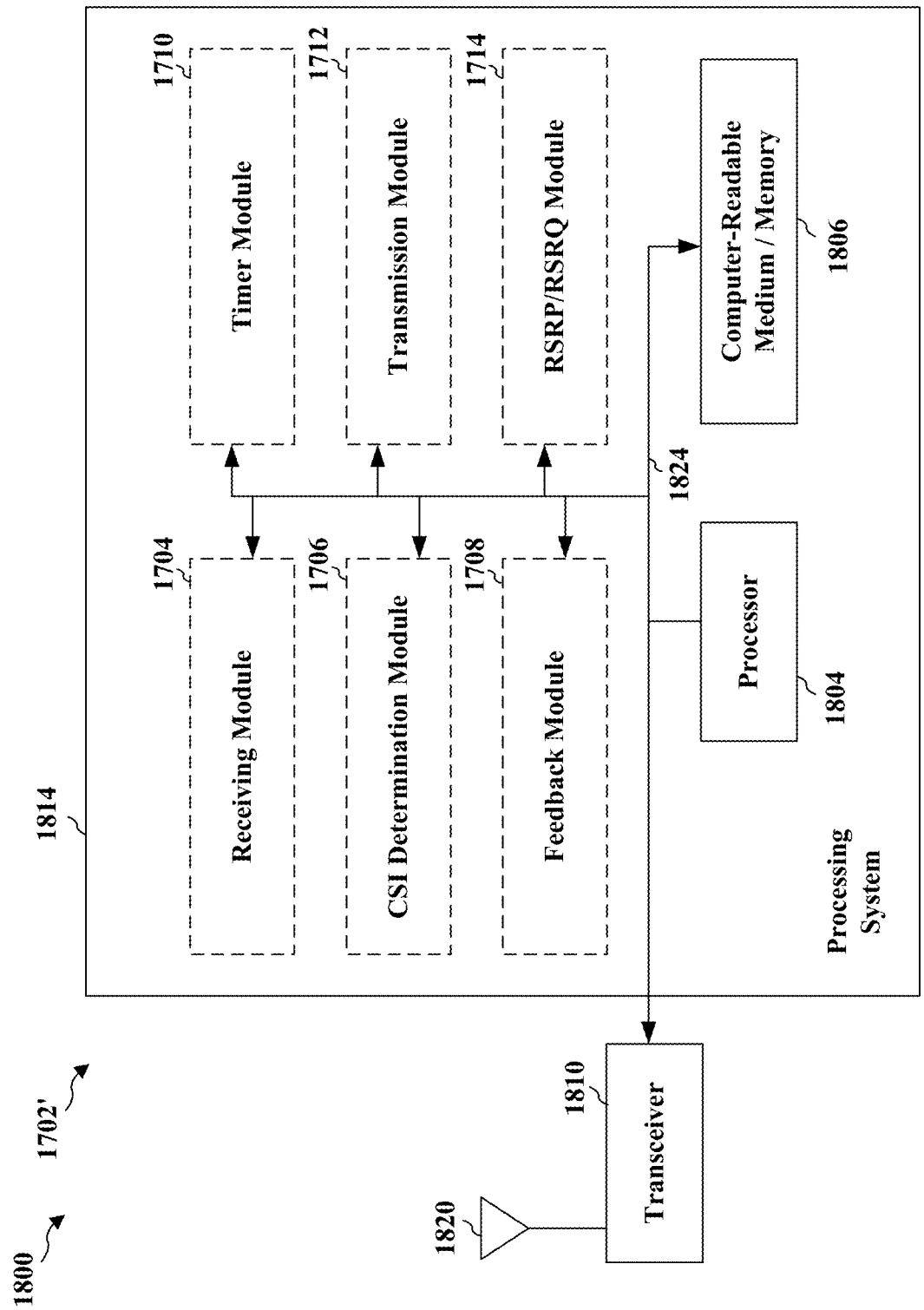
FIG. 18 is a diagram illustrating an example of a hardware implementation for an apparatus employing a processing system.

The apparatus may include additional modules that perform each of the steps of the algorithm in the aforementioned flow chart of FIGS. 8D and 16. As such, each step in the aforementioned flow charts of FIGS. 8D and 16 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof FIG. 18 is a diagram 1800 illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware modules, represented by the processor 1804, the modules 1704, 1706, 1708, 1710, 1712, 1714, and the computer-readable medium/memory 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the receiving module 1704. In addition, the transceiver 1810 receives information from the processing system 1814, specifically the transmission module 1712, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described supra for any particular apparatus. The computer-readable medium/memory 1806 may also be used for storing data that is manipulated by the processor 1804 when executing software. The processing system further includes at least one of the modules 1704, 1706, 1708, 1710, 1712, and 1714. The modules may be software modules running in the processor 1804, resident/stored in the computer readable medium/memory 1806, one or more hardware modules coupled to the processor 1804, or some combination thereof. The processing system 1814 may be a component of the UE 650 and may include the memory 660 and/or at least one of the TX processor 668, the RX processor 656, and the controller/processor 659.

In one configuration, the apparatus 1702/1702' for wireless communication includes means for determining CSI, means for determining whether to send the CSI based on at least one of a timer or a threshold, and means for sending the CSI upon determining to send the CSI. The apparatus may further include means for sending a request to a base station for sending the CSI and receiving a response from the base station based on the request. In an aspect, the CSI is sent to the base station based on the received response. The apparatus may further include means for receiving an uplink grant from a base station, the uplink grant being received when CSI is not sent for a time period greater than a second threshold. In an aspect, the CSI is sent based on the received uplink grant. The apparatus may further include means for estimating the CSI in each of a plurality of subframes, and means for determining the CSI based on a lowest CSI over the plurality of subframes or on an average of the estimated CSI over the plurality of subframes. The apparatus may further include means for receiving a configuration indicating how to determine the CSI, and means for determining the CSI based on the received configuration. The apparatus may further include means for receiving information indicating MBSFN subframes, and means for determining the CSI based on the received information.

The apparatus may further include means for selecting a RACH format for a RACH procedure based on the CSI. In an aspect, the CSI is sent through the RACH procedure and is indicated through the selected RACH format. The apparatus may further include means for receiving a periodic supervision message from a base station, and means for sending a response to the base station based on the received periodic supervision message. In an aspect, the CSI is sent with the response. The apparatus may further include determining at least one of an RSRQ or an RSRP, and means for sending the at least one of the RSRP or the RSRQ to a base station. In an aspect, the CSI is sent with the at least one of the RSRP or the RSRQ. The aforementioned means may be one or more of the aforementioned modules of the apparatus 1702 and/or the processing system 1814 of the apparatus 1702' configured to perform the functions recited by the aforementioned means. As described supra, the processing system 1814 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a user equipment (UE), comprising:
    receiving a transmission time interval (TTI) bundling transmission from a base station;
    decoding a subset of the TTI bundling transmission; and
    sending an acknowledgment to the base station to terminate the TTI bundling transmission early upon decoding the subset of the TTI bundling transmission,
    wherein channel state information (CSI) is indicated to the base station based on a percentage of the TTI bundling transmission received by the UE, wherein a TTI bundling size is based on the percentage of the TTI bundling transmission received by the UE.

2. The method of claim 1, further comprising receiving data modulated and coded with a modulation and coding scheme (MCS) from the base station, wherein the MCS is based on the percentage of the TTI bundling transmission received by the UE.

3. A method of wireless communication of a user equipment (UE), comprising:
    sending an uplink transmission to a base station; and
    receiving a data transmission from the base station, the data transmission having a modulation and coding scheme (MCS) determined based on the uplink transmission and a transmission time interval (TTI) bundling size that is also determined based on the uplink transmission;
    wherein the data transmission includes a request for the UE to adjust a subsequent uplink transmission if one or both of the determined MCS or the determined TTI bundling size differ from respective values that the UE expected.

4. A method of wireless communication of a user equipment (UE), comprising:
    determining a first transmission time interval (TTI) bundling size based on an estimated channel between a base station and the UE;
    receiving data with a second TTI bundling size from the base station;
    determining whether the second TTI bundling size differs from the first TTI bundling size by more than a threshold; and
    sending channel state information (CSI) after determining that the second TTI bundling size differs from the first TTI bundling size by more than the threshold.

5. The method of claim 4, wherein the threshold corresponds to a bundling size difference.

6. The method of claim 4, wherein the CSI is sent when a difference between the first bundling size and the second bundling size is greater than the threshold.

7. A method of wireless communication of a base station, comprising:
    sending a first transmission time interval (TTI) bundling transmission to a user equipment (UE);
    receiving an acknowledgment from the UE indicating that reception of the TTI bundling transmission was terminated early by the UE resulting in a percentage of the first TTI bundling transmission being received by the UE;
    determining a modulation and coding scheme (MCS) based on the percentage of the first TTI bundling transmission received by the UE; and sending a second TTI bundling transmission to the UE modulated and coded with the MCS;

wherein a TTI bundling size of the second TTI bundling transmission is based on the percentage of the first TTI bundling transmission received by the UE.

8. A method of wireless communication of a base station, comprising:
receiving an uplink transmission from a user equipment (UE);
determining a modulation and coding scheme (MCS) based on the received uplink transmission;
determining a transmission time interval (TTI) bundling size based on the received uplink transmission; and
sending a data transmission to the UE based on both the determined MCS and the determined TTI bundling size,
wherein the data transmission includes a request for the UE to adjust a subsequent uplink transmission if one or both of the determined MCS or the determined TTI bundling size differ from respective values that the UE expected.

9. An apparatus for wireless communication of a user equipment (UE), comprising:
a memory; and
at least one processor coupled to the memory and configured to:
receive a transmission time interval (TTI) bundling transmission from a base station;
decode a subset of the TTI bundling transmission; and
send an acknowledgment to the base station to terminate the TTI bundling transmission early upon decoding the subset of the TTI bundling transmission,
wherein channel state information (CSI) is indicated to the base station based on a percentage of the TTI bundling transmission received by the UE, wherein a TTI bundling size is based on the percentage of the TTI bundling transmission received by the UE.

10. The apparatus of claim 9, wherein the at least one processor is further configured to:
receive data modulated and coded with a modulation and coding scheme (MCS) from the base station, wherein the MCS is based on the percentage of the TTI bundling transmission received by the UE.

11. An apparatus for wireless communication of a user equipment (UE), comprising:
a memory; and
at least one processor coupled to the memory and configured to:
send an uplink transmission to a base station; and
receive a data transmission from the base station, the data transmission having a modulation and coding scheme (MCS) determined based on the uplink transmission and a transmission time interval (TTI) bundling size that is also determined based on the uplink transmission;
wherein the data transmission includes a request for the UE to adjust a subsequent uplink transmission if one or both of the determined MCS or the determined TTI bundling size differ from respective values that the UE expected.

12. An apparatus for wireless communication of a user equipment (UE), comprising:
a memory; and
at least one processor coupled to the memory and configured to:

determine a first transmission time interval (TTI) bundling size based on an estimated channel between a base station and the UE;
receive data with a second TTI bundling size from the base station;
determine whether the second TTI bundling size differs from the first TTI bundling size by more than a threshold; and
send channel state information (CSI) after determining that the second TTI bundling size differs from the first TTI bundling size by more than the threshold.

13. The apparatus of claim 12, wherein the threshold corresponds to a bundling size difference.

14. The apparatus of claim 12, wherein the CSI is sent when a difference between the first bundling size and the second bundling size is greater than the threshold.

15. An apparatus for wireless communication of a base station, comprising:
a memory; and
at least one processor coupled to the memory and configured to:
send a first transmission time interval (TTI) bundling transmission to a user equipment (UE);
receive an acknowledgment from the UE indicating that reception of the TTI bundling transmission was terminated early by the UE resulting in a percentage of the first TTI bundling transmission being received by the UE;
determine a modulation and coding scheme (MCS) based on the percentage of the first TTI bundling transmission received by the UE; and
send a second TTI bundling transmission to the UE modulated and coded with the MCS;
wherein a TTI bundling size of the second TTI bundling transmission is based on the percentage of the first TTI bundling transmission received by the UE.

16. An apparatus for wireless communication of a base station, comprising:
a memory; and
at least one processor coupled to the memory and configured to:
receive an uplink transmission from a user equipment (UE);
determine a modulation and coding scheme (MCS) based on the received uplink transmission;
determine a transmission time interval (TTI) bundling size based on the received uplink transmission; and
send a data transmission to the UE based on both the determined MCS and the determined TTI bundling size,
wherein the data transmission includes a request for the UE to adjust a subsequent uplink transmission if one or both of the determined MCS or the determined TTI bundling size differ from respective values that the UE expected.

17. A non-transitory computer-readable medium storing computer executable code for wireless communication of a user equipment (UE), the code when executed by a processor causes the processor to:
receive a transmission time interval (TTI) bundling transmission from a base station;
decode a subset of the TTI bundling transmission; and
send an acknowledgment to the base station to terminate the TTI bundling transmission early upon decoding the subset of the TTI bundling transmission,
wherein channel state information (CSI) is indicated to the base station based on a percentage of the TTI bundling transmission received by the UE, wherein a TTI bundling size is based on the percentage of the TTI bundling transmission received by the UE.

18. A non-transitory computer-readable medium storing computer executable code for wireless communication of a user equipment (UE), the code when executed by a processor causes the processor to:
- send an uplink transmission to a base station; and
- receive a data transmission from the base station, the data transmission having a modulation and coding scheme (MCS) determined based on the uplink transmission and a transmission time interval (TTI) bundling size that is also determined based on the uplink transmission;
- wherein the data transmission includes a request for the UE to adjust a subsequent uplink transmission if one or both of the determined MCS or the determined TTI bundling size differ from respective values that the UE expected.

19. A non-transitory computer-readable medium storing computer executable code for wireless communication of a user equipment (UE), the code when executed by a processor causes the processor to:
- determine a first transmission time interval (TTI) bundling size based on an estimated channel between a base station and the UE;
- receive data with a second TTI bundling size from the base station;
- determine whether the second TTI bundling size differs from the first TTI bundling size by more than a threshold; and
- send channel state information (CSI) after determining that the second TTI bundling size differs from the first TTI bundling size by more than the threshold.

20. A non-transitory computer-readable medium storing computer executable code for wireless communication of a base station, the code when executed by a processor causes the processor to:
- send a first transmission time interval (TTI) bundling transmission to a user equipment (UE);
- receive an acknowledgment from the UE indicating that reception of the TTI bundling transmission was terminated early by the UE resulting in a percentage of the first TTI bundling transmission being received by the UE;
- determine a modulation and coding scheme (MCS) based on the percentage of the first TTI bundling transmission received by the UE; and
- send a second TTI bundling transmission to the UE modulated and coded with the MCS;
- wherein a TTI bundling size of the second TTI bundling transmission is based on the percentage of the first TTI bundling transmission received by the UE.

21. A non-transitory computer-readable medium storing computer executable code for wireless communication of a base station, the code when executed by a processor causes the processor to:
- receive an uplink transmission from a user equipment (UE);
- determine a modulation and coding scheme (MCS) based on the received uplink transmission;
- determine a transmission time interval (TTI) bundling size based on the received uplink transmission; and
- send a data transmission to the UE based on both the determined MCS and the determined TTI bundling size,
- wherein the data transmission includes a request for the UE to adjust a subsequent uplink transmission if one or both of the determined MCS or the determined TTI bundling size differ from respective values that the UE expected.

* * * * *